(12) United States Patent
Nakamura et al.

(10) Patent No.: US 10,788,099 B2
(45) Date of Patent: Sep. 29, 2020

(54) TORSIONAL VIBRATION DAMPER

(71) Applicant: TOYOTA JIDOSHA KABUSHIKI KAISHA, Toyota-shi, Aichi (JP)

(72) Inventors: Taiki Nakamura, Zama (JP); Hideyuki Nishida, Sunto-gun (JP); Masayuki Ishibashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/539,108

(22) Filed: Aug. 13, 2019

(65) Prior Publication Data
US 2020/0088265 A1 Mar. 19, 2020

(30) Foreign Application Priority Data
Sep. 14, 2018 (JP) .................................. 2018-172272

(51) Int. Cl.
*F16F 15/14* (2006.01)
(52) U.S. Cl.
CPC .................. *F16F 15/1457* (2013.01)
(58) Field of Classification Search
CPC .................................................. F16F 15/1457
See application file for complete search history.

(56) References Cited

U.S. PATENT DOCUMENTS

| 6,026,940 | A  | * | 2/2000  | Sudau ................... | F16F 15/145 |
| | | | | | 192/3.28 |
| 10,458,512 | B2 | * | 10/2019 | Nishida ................ | F16F 15/145 |
| 2013/0239745 | A1 | | 9/2013 | Maienschein et al. | |
| 2016/0169318 | A1 | * | 6/2016 | Miyahara .............. | F16F 15/145 |
| | | | | | 188/378 |
| 2017/0234401 | A1 | * | 8/2017 | Horita ................... | F16F 15/145 |
| | | | | | 74/572.21 |
| 2018/0119773 | A1 | * | 5/2018 | Nishida ................ | F16F 15/145 |
| 2019/0048972 | A1 | * | 2/2019 | Iwagaki ............... | F16F 15/1457 |
| 2019/0285136 | A1 | * | 9/2019 | Ishibashi ............. | F16F 15/3156 |

FOREIGN PATENT DOCUMENTS

| JP | 5783542 B2 | 9/2015 |
| JP | 2017-031995 A | 2/2017 |
| JP | 2017-145857 A | 8/2017 |

* cited by examiner

*Primary Examiner* — Vicky A Johnson
(74) *Attorney, Agent, or Firm* — Oliff PLC

(57) ABSTRACT

A torsional vibration damper in which a noise resulting from collision of an inertia body against a rotary member is reduced. An inertia body is arranged coaxially with the rotary member, and rolling members are interposed between the rotary member and the inertial body to transmit torque of the rotary member to the inertia body. A first clearance between an outer circumference of a rotary member and an inner circumference of the inertia body created when rolling members are centrifugally pushed onto raceway surfaces is identical to or narrower than a second clearance between one of the rolling members situated at a highest level and a bottom surface of a guide section.

6 Claims, 15 Drawing Sheets

TORSIONAL VIBRATION DAMPER

CROSS-REFERENCE TO RELATED APPLICATIONS

The present invention claims the benefit of Japanese Patent Application No. 2018-172272 filed on Sep. 14, 2018 with the Japanese Patent Office, the disclosure of which is incorporated herein by reference in its entirety.

BACKGROUND

Field of the Disclosure

The present disclosure relates to a torsional vibration damper that damps a torsional vibration resulting from a torque pulse.

Discussion of the Related Art

US 2017/0234401 A1 describes a torsional vibration damper that damps a torsional vibration resulting from a torque pulse a centrifugal pendulum motion of a mass. The torsional vibration damper taught by US 2017/0234401 A1 comprises: a rotating body rotated by an input torque; an inertial body rotated by the torque pulse relatively to the rotating body; and a plurality of rolling bodies individually connecting the rotating body and the inertial body to transmit torque therebetween.

For example, in the device shown in FIGS. 16 and 17 of the US 2017/0234401 A1, the inertial body is disposed radially outwardly of the rotating body on the same plane while being allowed to rotate relatively thereto. According to the teachings of US 2017/0234401 A1, a plurality of guide grooves protrude from a circumference of the rotating body at regular intervals in the circumferential direction, and a rolling body is held in each of the guide grooves. In each of the guide groove, the rolling body is allowed to be displaced in the radial direction, but an oscillating motion of the rolling body in the circumferential direction is restricted by guide walls of the guide grooves. On the other hand, in the inertial body, a plurality of guide holes are formed at regular intervals in the circumferential direction to be overlapped with the guide grooves of the rotating body. A radially outer edge of each of the guide holes is bulged radially outwardly to serve as a rolling surface to which the rotating body held in the guide groove is contacted. When the rotating body is rotated at a high speed, each of the rolling bodies is centrifugally displaced radially outwardly in the guide groove, and eventually brought into contact with a width center of the rolling surface. A curvature radius of the raceway surface is shorter than a curvature radius of a circumference of the inertial body.

If the rolling body thus centrifugally pushed onto the rolling surface is subjected to a torque pulse applied to the rotating body, the rolling body is oscillated along the rolling surface. That is, the rolling body is oscillated relatively to the inertial body by the pulsation of the input torque. Consequently, vibrations resulting from the torque pulse are damped by such oscillating motion of the rolling body. In order to allow the inertial body to rotate smoothly relative to the rotating body, according to the teachings of US 2017/0234401 A1, a diameter of a center hole of the inertial body fitted onto a shaft of the rotating body is larger than a diameter of the shaft of the inertial body.

JP-A-2017-31995 also describes a torsional vibration damper. According to the teachings of JP-A-2017-31995, in order to reduce noise in the damper, a rolling member is gravitationally brought into contact with a bottom surface of a guide groove before comes into contact with a width end of a raceway surface, when a rotary member is rotated at a low speed.

Japanese patent publication No. 5783542 describes a centrifugal pendulum mechanism comprising a pair of pendulum masses opposed arranged across a disc. Specifically, the pendulum masses are connected to each other by a spacing bolt penetrating through a guide path formed in the disc. According to the teachings of Japanese patent publication No. 5783542, an elastic member is arranged around the spacing bolt to reduce collision impact of the spacer bolt against the guide path.

In the torsional vibration damper taught by US 2017/0234401 A1, the inertial body being rotated together with the rotating body drops gravitationally when a rotational speed is reduced and hence the force of gravity overwhelms the centrifugal force being applied to the inertial body. Consequently, the rolling bodies are brought into contact with the rolling surfaces and the guide grooves thereby generating collision noise.

Inventors of the present disclosure have found that such collision noise changes depending on a clearance created between an inner circumference of the inertial body and an outer circumference of the rotating body when a rotational speed of the rotating body is high. Specifically, if the clearance between the inner circumference of the inertial body and the outer circumference of the rotating body is narrower than a clearance between the rolling body situated at a radially outermost position of the rolling surface and a bottom surface of the guide groove, the inertial body comes into contact with the rotating body before the rolling body comes into contact with the bottom surface of the guide groove when the rotational speed of the rotating body is reduced.

That is, a distance from the rolling body situated at the radially outermost position of the rolling surface to the bottom surface of the guide groove is longer than a distance from the inner circumference of the inertial body to the outer circumference of the rotating body. In this case, therefore, a collision noise due to collision of the rolling body against the bottom surface of the guide groove is noisier than a collision noise due to collision of the inertial body against the rotating body.

SUMMARY

The present disclosure has been conceived noting the above-described technical problems, and it is therefore an object of the present disclosure to provide a torsional vibration damper in which a noise resulting from collision of an inertia body against a rotary member is reduced.

Embodiments of the present disclosure relates to a torsional vibration damper, comprising: a disc-shaped rotary member that is rotated by a torque applied thereto; an annular-shaped inertia body that is arranged coaxially with the rotary member while being allowed to oscillate relatively with respect to the rotary member in response to a pulsation of the torque; a plurality of rolling members interposed between the rotary member and the inertial body to transmit the torque applied to the rotary member to the inertia body; a plurality of guide sections formed on an outer circumference of the rotary member to hold each rolling member of the plurality of rolling members, while allowing the rolling members to move in a radial direction but restricting the rolling members to move in a circumferential direction; a plurality of raceway surfaces formed on the inertia body to which the respective rolling members are contacted, whose curvature radii are individually shorter than a curvature radius of an outer circumference of the inertia body; wherein the rotary member and the inertia body are arranged in such a manner that the outer circumference of the rotary member and an inner circumference of the inertia body are opposed to each other, and a first clearance between the outer circumference of the rotary member and the inner circumference of the inertia body created when the rolling members are individually pushed onto a radially outermost point of each of the respective raceway surfaces by a centrifugal force is identical to or narrower than a second clearance between one of the rolling members situated at a highest level and a bottom surface of the guide section.

In a non-limiting embodiment, the torsional vibration damper may further comprise a buffer member attached to at least one of the inner circumference of the inertia body and the outer circumference of the rotary member.

In a non-limiting embodiment, the buffer member may comprise a restricting section that restricts a displacement of the inertia body in the axial direction.

In a non-limiting embodiment, the inertia body may be arranged on radially outer side of the rotary member, and the inertia body may comprises a plurality of notches formed in radially inner portion of the inertia body to hold each guide section of the plurality of guide sections. In addition, the buffer member may be attached to the outer circumference of the rotary member in each clearance between the guide sections.

In a non-limiting embodiment, the buffer member may also be attached to the inner circumference of the inertia body in each clearance between the notches.

In a non-limiting embodiment, the buffer member may include a first buffer member attached to the outer circumference of the rotary member in each clearance between the guide sections, and a second buffer member attached to the inner circumference of the inertia body in each clearance between the notches. The first buffer member and the second buffer member may be opposed to each other.

In a non-limiting embodiment, the buffer member may include a buffering portion that is interposed in each clearance between one of side surfaces of the guide section and one of side surfaces of the notch, and between other one of side surfaces of the guide section and other one of side surfaces of the notch.

Thus, according to the exemplary embodiment of the present disclosure, the inertia body comes into contact with the rotary member when a rotational speed is reduced, before the rolling member comes into contact with the bottom surface of the guide section. According to the exemplary embodiment of the present disclosure, a mass of the inertia body will not be applied to the rolling member dropping gravitationally. For this reason, a collision impact of the rolling member against the bottom surface of the guide section can be reduced thereby reducing the noise in the torsional vibration damper, when the rotary member is rotated at a low speed, or when the rotary member is stopped.

In addition, a collision impact of the inertia body against the rotary member may be reduced by the buffer member attached to at least one of the inertia body and the rotary member.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
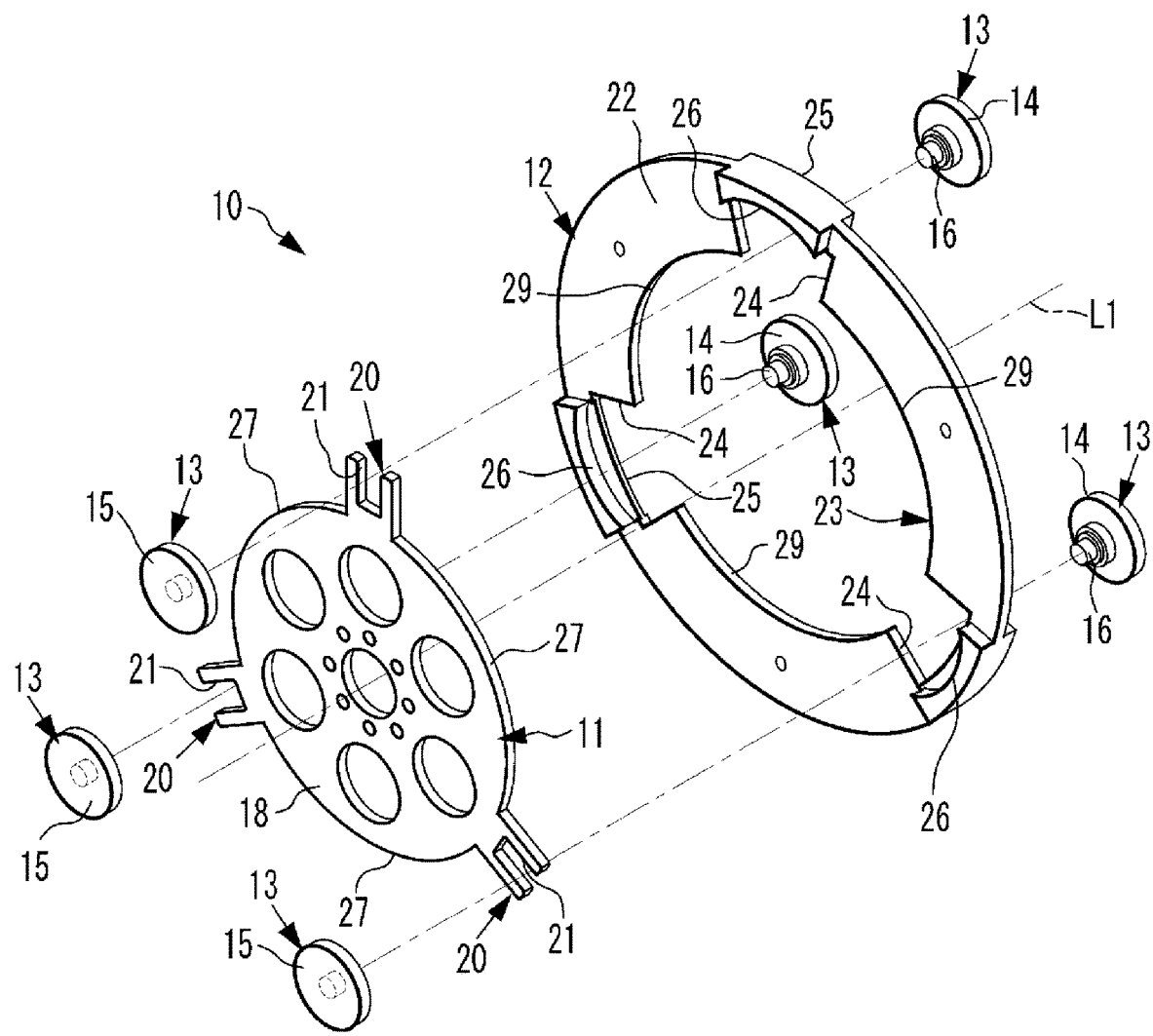
FIG. 1 is a perspective view showing one example of a torsional vibration damper according to an exemplary embodiment of the present disclosure.

FIG. 1 is a perspective view showing one example of a torsional vibration damper 10 according to an exemplary embodiment of the present disclosure. As shown in FIG. 1, a torsional vibration damper 10 includes a rotary member 11, an inertia body 12, and a plurality of rolling members 13. For example, the torsional vibration damper 10 may be used in a vehicle, and the rotary member 11 may be fitted onto a crankshaft of an engine, a propeller shaft for delivering torque to a wheel, or an axle shaft (neither of which are shown). The rotary member 11 is rotated e.g., by an output torque of the engine around a rotational center L1, and torsional vibrations are generated on the shaft on which the rotary member 11 is fitted by a pulsation of the torque applied to the rotary member 11.

The rolling member 13 is configured by integrally coupling an annular-shaped first diametrically large section 14 and an annular-shaped second diametrically large section 15 through a shaft 16. The first diametrically large section 14 and the second diametrically large section 15 have their sizes, including diameters, thicknesses, and masses, configured to be the same. The shaft 16 is configured to be of smaller diameter than the first diametrically large section 14 and the second diametrically large section 15.

The rotary member 11 comprises a disk plate section 18, and a plurality of guide section 20 formed on a circumference of the disk plate section 18 at regular intervals in the circumferential direction. Specifically, the guide section 20 as a guide groove comprises a pair of guide walls 21 protruding radially outwardly from the disk plate section 18, and the shaft 16 of the rolling member 13 is held in each of the guide section 20. Although the number of rolling members 13 is described as three in FIG. 1, the present disclosure is not limited to this, and there may be four or more, for example, or there may be two.

The inertia body 12 comprises an annular plate section 22, a hole 23, a plurality of notches 24, a first raceway surface 25, and a second raceway surface 26. Specifically, the hole 23 is formed on a central portion of the annular plate section 22 around the rotational center L1, and a diameter of the hole 23 is larger than an outer diameter of the disk plate section 18 of the rotary member 11. Each of the notches 24 is formed cut out in such a manner that part of the annular plate section 22 opens on an inner circumferential side at regular intervals in the circumferential direction. The inertia body 12 is situated radially outside of the rotary member 11, and each of the guide section 20 is inserted individually into the notch 24. That is, each of the rolling members 13 supported by each of the guide sections 20 of the rotary member 11 is held in each of the notches 24 of the inertia body 12.

When the rotary member 11 is rotated by a torque applied thereto, the rolling member 13 is subjected to a centrifugal force and a pulsation of the torque applied to the rotary member 11. In this situation, the shaft 16 of the rolling member 13 comes into contact with the guide walls 21 of the guide section 20 so that an oscillating motion of the rolling member 13 within the guide section 20 is restricted, but the rolling member 13 is allowed to move in the radial direction along the guide walls 21. Eventually, the first diametrically large section 14 of the rolling member 13 is centrifugally brought into contact with the first raceway surface 25 of the inertia body 12, and the second diametrically large section 15 is centrifugally brought into contact with the second raceway surface 26 of the inertia body 12. Consequently, torque of the rotary member 11 is transmitted to the inertia body 12, and the inertia body 12 is oscillated relative to the rotary member 11 in response to the pulsation of the torque applied to the rotary member 11. In this situation, the first diametrically large section 14 of the rolling member 13 rolls on the first raceway surface 25 and the second diametrically large section 15 rolls on the second raceway surface 26. That is, the shaft 16 of the rolling member 13 serves as a connection member connecting the rotary member 11 to the inertia body 12, and vibrations resulting from pulsation of the torque is damped by such oscillating motion of the inertia body 12. A thickness of the annular plate section 22 of the inertia body 12 may be not only thicker than but also identical to a thickness of the disk plate section 18 of the rotary member 11.

Figure 2:
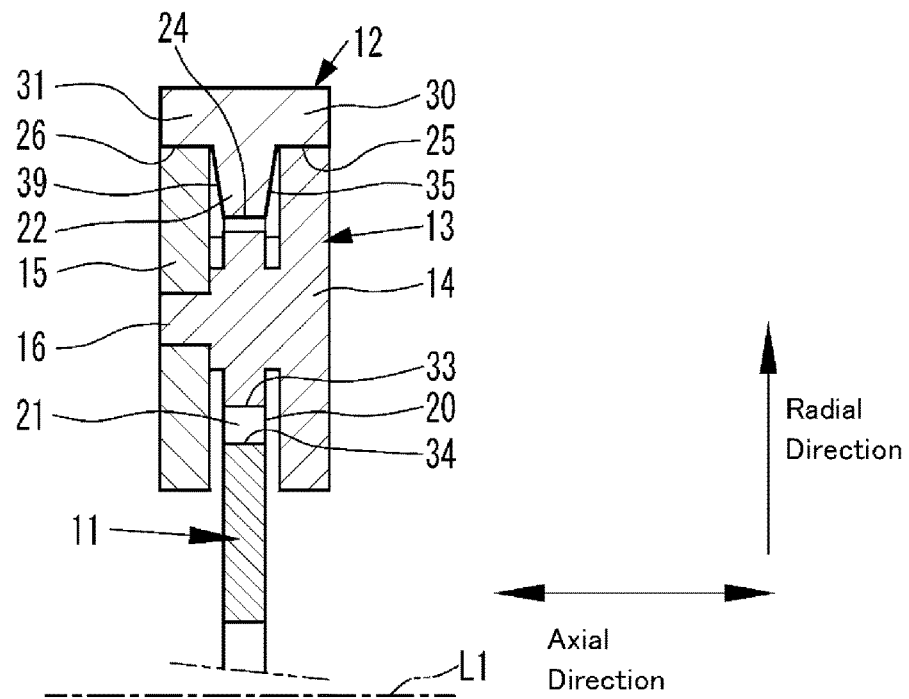
FIG. 2 is a partial cross-sectional view of the torsional vibration damper showing cross-sections of the rotary member, the inertia body, and the rolling member.
Figure 3:
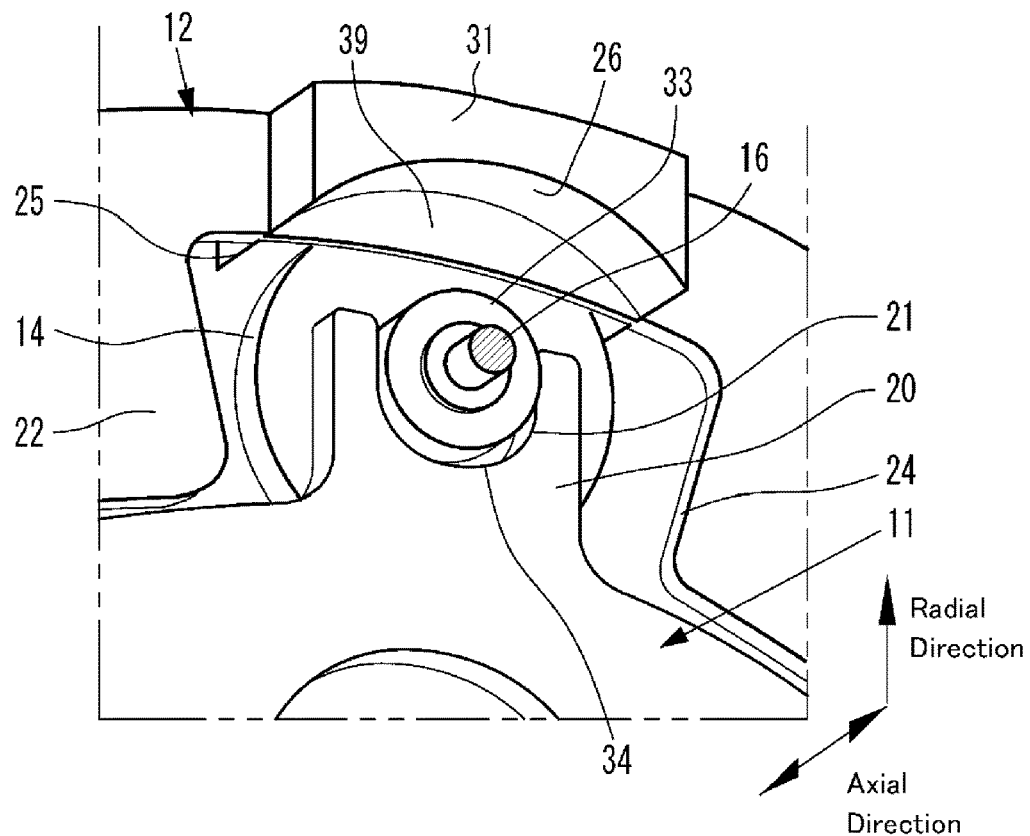
FIG. 3 is a partial perspective view showing a notch of the inertia body shown in FIG. 2 in an enlarged scale.

FIG. 2 is a partial cross-sectional view of the torsional vibration damper 10 showing cross-sections of the rotary member 11, the inertia body 12, and the rolling member 13 along the radial direction. In the situation illustrated in FIG. 2, the rotary member 11 is rotated at a speed higher than an idling speed of the engine, and the rolling member 13 is centrifugally pushed onto radially outermost portions of the first raceway surface 25 and the second raceway surface 26. A configuration of the notch 24 is shown in FIG. 3 in more detail. In FIG. 3, the second diametrically large section 15 is omitted for the sake of illustration.

As shown in FIGS. 2 and 3, the inertia body 12 includes a first bulging section 30 and a second bulging section 31 that jut out to both sides in the axial direction from the annular plate section 22. Specifically, the first bulging section 30 and the second bulging section are formed on radially outer side of the notch 24, and a circumferential length of each of the first bulging section 30 and the second bulging section 31 is identical to or shorter than a circumferential length of the notch 24. The first raceway surface 25 is formed on an inner circumferential surface of the first bulging section 30, and the second raceway surface 26 is formed on an inner circumferential surface of the second bulging section 31.

The rolling member 13 is formed with a substantially H-shaped cross-section. In other words, the first diametrically large section 14 and the second diametrically large section 15 are formed on both sides of the shaft 16 in the axial direction, and the first diametrically large section 14 and the second diametrically large section 15 are in balance across the shaft 16. An intermediate portion of the shaft 16 between the first diametrically large section 14 and the second diametrically large section 15 is expanded to form a diametrically small section 33 that is held in the guide section 20 of the rotary member 11. A thickness of the diametrically small section 33 may be identical to a thickness of the guide wall 21 of the guide section 20. Instead, in order to reduce a frictional resistance between the rolling member 13 and the guide section 20, a bearing may also be fitted onto the shaft 16 to serve as the diametrically small section 33. Here, it is to be noted that the diametrically small section 33 may be omitted. In this case, the shaft 16 may be held in the guide section 20 as it is, or a groove may be formed on the shaft 16 to be engaged with the guide section 20.

An axial movement of the rolling member 13 is restricted by the guide section 20 situated between the first diametrically large section 14 and the second diametrically large section 15. According to the exemplary embodiment, a clearance between the first diametrically large section 14 and the second diametrically large section 15 of the rolling member 13 is slightly wider than a thickness of the guide section 20 so that the rolling member 13 is allowed to move slightly in the axial direction. In order to align the rolling member 13 to the axial center of the inertia body 12, in the annular plate section 22, a first tapered surface 35 is formed radially inner side of the first raceway surface 25, and a second tapered surface 39 is formed radially inner side of the second raceway surface 26.

As described, when the rotary member 11 is rotated, the rolling member 13 is centrifugally displaced radially outwardly. In this situation, the shaft 16 of the rolling member 13 is guided by the guide walls 21 of the rotary member 11. Eventually, the first diametrically large section 14 of the rolling member 13 is centrifugally brought into linear contact with the first raceway surface 25 of the inertia body 12, and the second diametrically large section 15 is centrifugally brought into linear contact with the second raceway surface 26 of the inertia body 12. That is, the rolling member 13 is stopped by the first raceway surface 25 and the second raceway surface 26.

When the rotational speed of the rotary member 11 is reduced lower than e.g., the idling speed of the engine, the rolling member 13 is displaced radially inwardly within the guide section 20, and eventually, a circumferential surface of the diametrically small section 33 comes into contact with a bottom surface 34 of the guide section 20. In order to reduce a noise and an applied stress resulting from a collision of the rolling member 13 against the bottom surface 34 of the guide section 20, according to the exemplary embodiment, the bottom surface 34 is formed into an inwardly depressed rounded surface having a predetermined curvature radius. A curvature of the bottom surface 34 may be substantially identical to a curvature of the diametrically small section 33 of the rolling member 13.

Each of the first raceway surface 25 and the second raceway surface 26 is individually shaped into an arcuate surface whose curvature radius is shorter than the curvature radius of the annular plate section 22 of the inertia body 12. That is, a center of curvature of each of the first raceway surface 25 and the second raceway surface 26 is individually displaced from the rotational center L1.

When the rotary member 11 is rotated at a high speed, specifically, the first diametrically large section 14 of the rolling member 13 is pushed onto the first raceway surface 25 at a circumferentially intermediate portion as a radially outermost position, and the second diametrically large section 15 is pushed onto the second raceway surface 26 at a circumferentially intermediate portion as a radially outermost position. The torque of the rotary member 11 is transmitted to the inertia body 12 through the rolling members 13 so that the inertia body 12 is rotated together with the rotary member 11. In this situation, a predetermined clearance is maintained between the inertia body 12 and the rotary member 11.

The inertia body 12 rotating together with the rotary member 11 is oscillated or rotated relative to the rotary member 11 by an inertial torque resulting from the pulsation of torque applied the rotary member 11. Consequently, the rolling member 13 is oscillated within the first raceway surface 25 and the second raceway surface 26, and torsional vibrations resulting from the pulsation of the torque is suppressed by such oscillating motion of the inertia body 12.

Figure 4A:
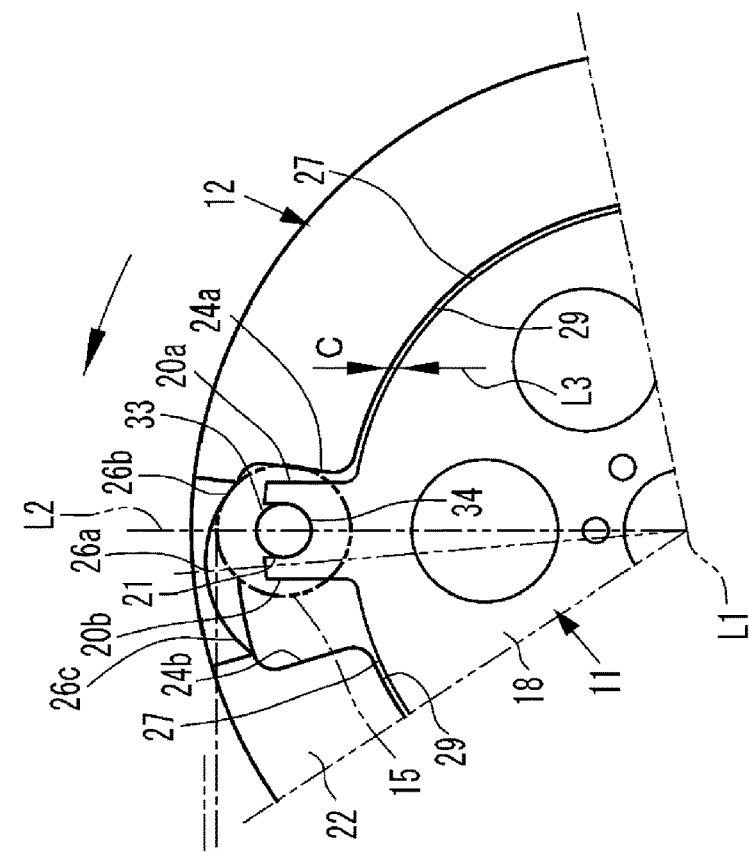
FIG. 4A is a partial front view showing a situation in which the rolling member is situated at an intermediate position on a raceway surface.
Figure 4B:
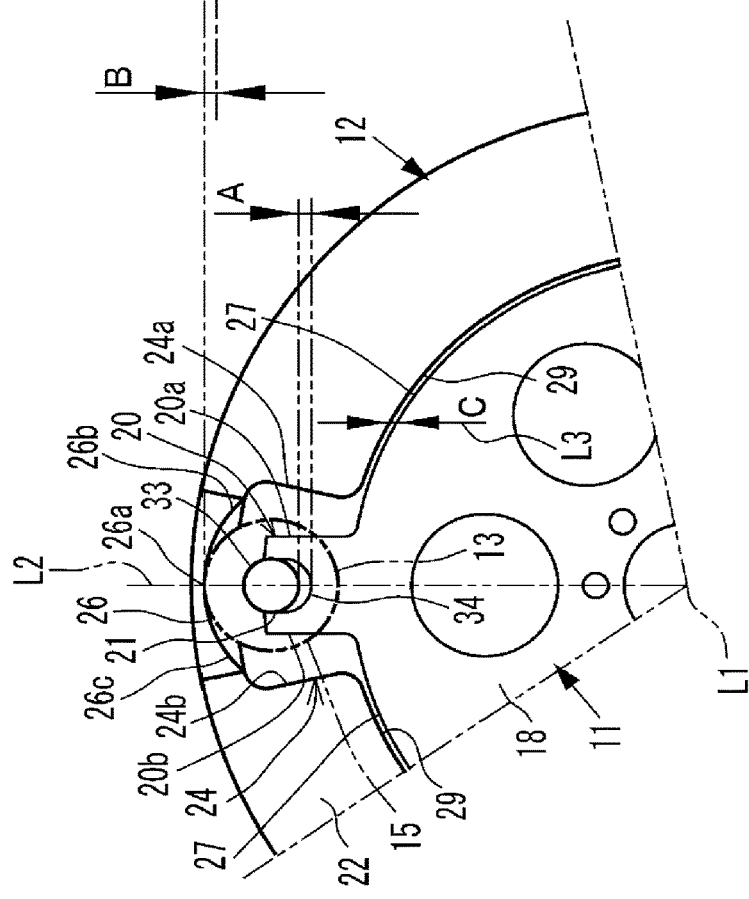
FIG. 4B is a partial front view showing a situation in which the rolling member is situated at a width end of the raceway surface.

FIG. 4A shows a position of the second diametrically large section 15 of the rolling member 13 when the rotary member 11 is rotated at a high speed without being subjected to a torque pulse, and FIG. 4B shows a position of the second diametrically large section 15 of the rolling member 13 when the rotary member 11 is rotated at a high speed while being subjected to a torque pulse. As illustrated in FIG. 4B, when the rotary member 11 is rotated at a high speed without being subjected to the torque pulse, the diametrically large sections 14, 15 of the rolling member 13 is centrifugally pushed onto the radially outermost points 25a, 26a of the raceway surfaces 25, 26.

A clearance A shown in FIG. 4A is created between the diametrically small section 33 of the rolling member 13 and the bottom surface 34 of the guide section 20 in the radial direction when the rotary member 11 is rotated at a high speed without being subjected to the torque pulse. When the rolling member 13 is subjected to the torque pulse, the rolling member 13 is oscillated from the radially outermost point 25a, 26a to a width end 25b, 26b of the raceway surfaces 25, 26. Consequently, the rolling member 13 is displaced radially inwardly by the raceway surfaces 25, 26. In FIGS. 4A and 4B, "B" represents a displacement distance of the rolling member 13 that is displaced radially inwardly by the raceway surfaces 25, 26 when oscillated by the torque pulse. According to the exemplary embodiment, the clearance A is set identical to or slightly wider than the displacement distance B of the rolling member 13.

The curvature radius of each of the raceway surfaces 25, 26 is individually shorter than a radial distance between the radially outermost point 25a, 26a to the rotational center L1. Given that the clearance A is identical to the displacement distance B and that the inertia body 12 is oscillated by the torque pulse relative to the rotary member 11 in the direction indicated by the arrow in FIG. 4B, the rolling member 13 is displaced radially inwardly by the raceway surfaces 25, 26, and the diametrically small section 33 of the rolling member 13 is brought into contact with the bottom surface 34 of the guide section 20 at the width ends 25b, 26b of the raceway surfaces 25, 26 as illustrated in FIG. 4B. That is, the oscillation of the inertia body 12 relative to the rotary member 11 in the direction indicated by the arrow in FIG. 4B is stopped at the width ends 25b, 26b of the raceway surfaces 25, 26. Likewise, when the inertia body 12 is oscillated relative to the rotary member 11 in the opposite direction to the arrow in FIG. 4B, the inertia body 12 is stopped at the other width ends 26c of the raceway surfaces 25, 26.

As described, the clearance A is wider than the displacement distance B. Therefore, given that the inertia body 12 is oscillated relative to the rotary member 11 in the direction indicated by the arrow in FIG. 4B, the rolling member 13 will not be brought into contact with the bottom surface 34 of the guide section 20 at the width ends 25b, 26b of the raceway surfaces 25, 26. Eventually, a first side surface 24a of the notch 24 is brought into contact with a first side surface 20a of the guide section 20 opposed to the first side surface 24a so that further oscillation of the inertia body 12 in the direction indicated by the arrow in FIG. 4B is restricted. Likewise, when the inertia body 12 is oscillated relative to the rotary member 11 in the opposite direction to the arrow in FIG. 4B, a second side surface 24b of the notch 24 is brought into contact with a second side surface 20b of the guide section 20 opposed to the second side surface 24b so that further oscillation of the inertia body 12 in the opposite direction to the arrow in FIG. 4B is restricted.

An inner diameter of the inertia body 12 is slightly larger than an outer diameter of the rotary member 11. For example, when the rotary member 11 is rotated at a high speed, a predetermined clearance is maintained substantially homogeneously between an inner circumference 29 of the inertia body 12 and an outer circumference 27 of the rotary member 11 entirely around the rotary member 11, irrespective of occurrence of torque pulse.

In a specific condition, for example, when the rotary member 11 is rotated at a low speed or stopped, the centrifugal force applied to each of the rolling members 13 is reduced. In this situation, the rolling members 13 are not pushed onto the first raceway surface 25 and the second raceway surface 26, and the inertia body 12 is no longer sustained by the rolling members 13. Consequently, the inertia body 12 drops gravitationally and the inner circumference 29 of the inertia body 12 comes into contact with the outer circumference 27 of the rotary member 11. Specifically, the centrifugal force applied to each of the rolling members 13 is reduced when the rotary member 11 starts rotating, just before the rotation of the rotary member 11 stops, and when the rotary member 11 stops. In this situation, in one of the guide sections 20 situated at the highest level, the rolling member 13 held in the guide wall 21 also drops gravitationally in the radial direction, and comes into contact with the bottom surface 34. That is, a travelling distance of the rolling member 13 thus drops in the guide wall 21 to the bottom surface 34 corresponds to the aforementioned clearance A.

In the torsional vibration damper 10, specifically, the inner diameter of the inertia body 12 and the outer diameter of the rotary member 11 are set in such a manner that a clearance C created between the inner circumference 29 of the inertia body 12 and the outer circumference 27 of the rotary member 11 in the radial direction when the rotary member 11 is rotated at a high speed is adjusted to be identical to or narrower than the aforementioned clearance A. Therefore, when the attraction of gravity overwhelms the centrifugal force applied to each of the rolling members 13, the inner circumference 29 of the inertia body 12 comes into contact with the outer circumference 27 of the rotary member 11 before the rolling member 13 held in one of the guide sections 20 situated at the highest level comes into contact with the bottom surface 34 of the guide wall 21.

As explained in the background chapter, the noise resulting from collision of the rolling member 13 against the bottom surface 34 of the guide section 20 is larger than a noise resulting from collision of the inertia body 12 against the rotary member 11. Given that the clearance C is wider than the clearance A, the inner circumference 29 of the inertia body 12 will not be brought into contact with the outer circumference 27 of the rotary member 11, but the diametrically small section 33 of the rolling member 13 will be brought into contact with the bottom surface 34 of the guide section 20. According to the exemplary embodiment, therefore, the clearance C is set identical to or narrower than the clearance A thereby reducing the noise generated in the torsional vibration damper 10. Accordingly, the clearance A between the diametrically small section 33 of the rolling member 13 situated at the radially outermost position and the bottom surface 34 of the guide section 20 corresponds to the second clearance of the embodiment, and the clearance C created between the inner circumference 29 of the inertia body 12 and the outer circumference 27 of the rotary member 11 when the rotary member 11 is rotated at a high speed corresponds to the first clearance of the embodiment.

Figure 5:
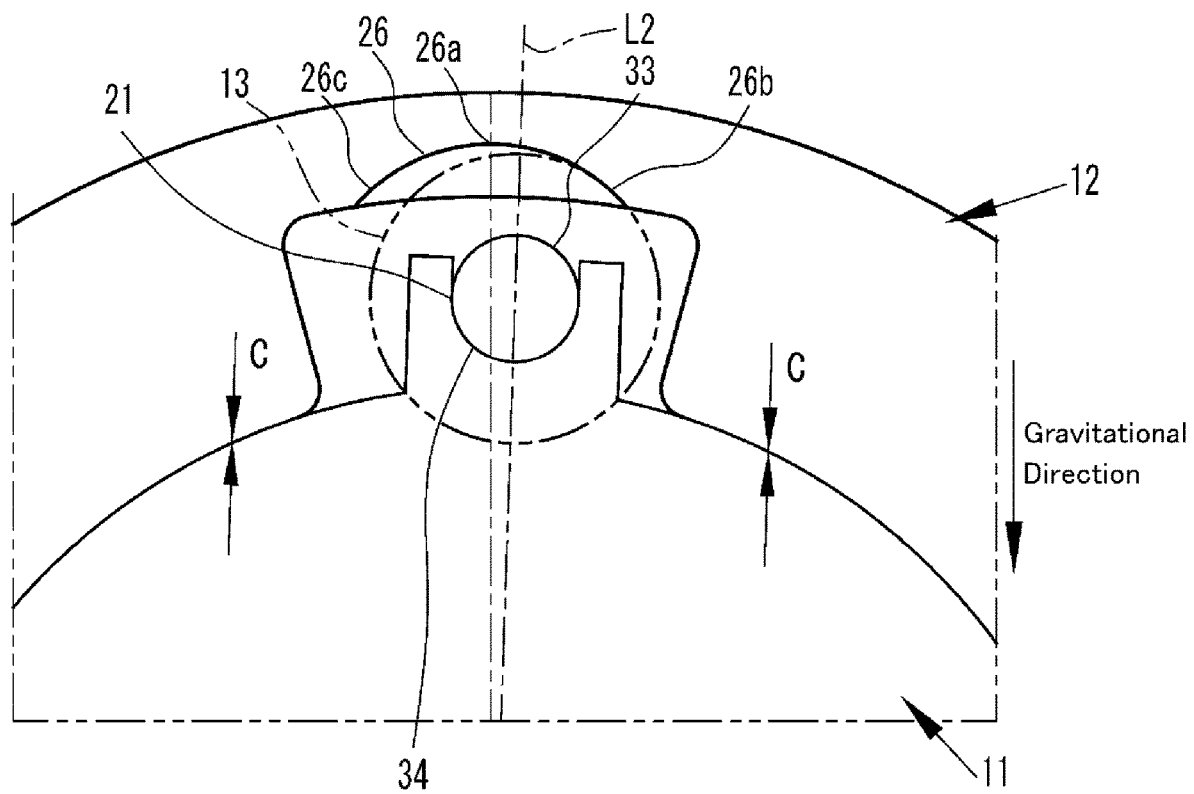
FIG. 5 is a partial front view showing a situation in which a guide section is situated at position of 12 o'clock.
Figure 6:
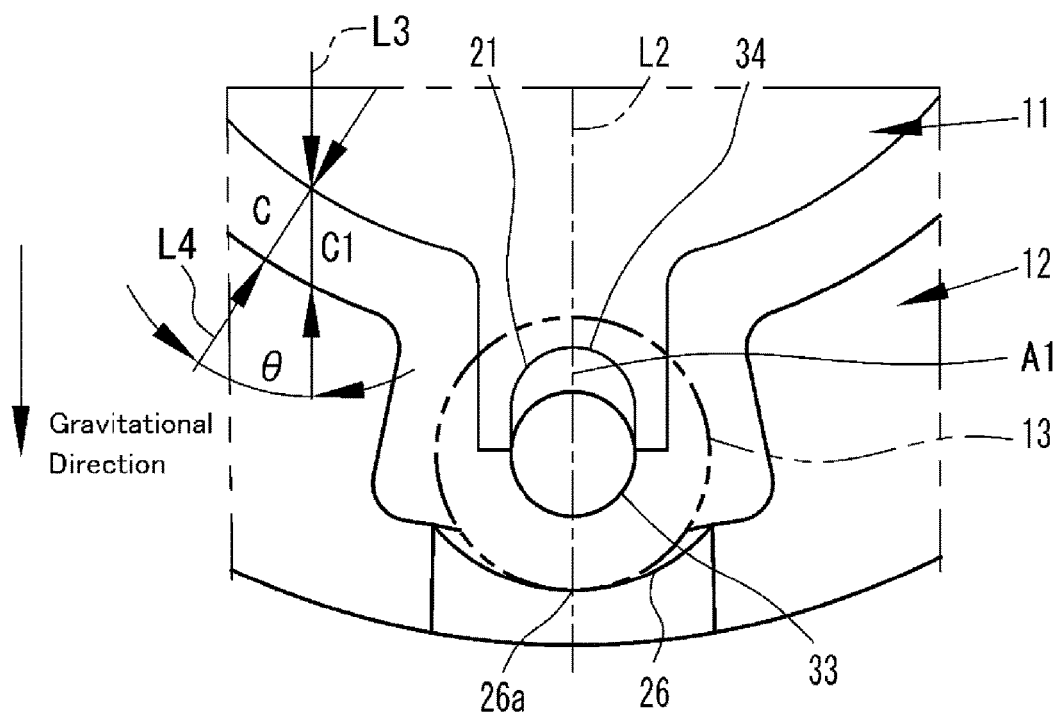
FIG. 6 is a partial front view showing a situation in which the guide section is situated at a position of 6 o'clock.
Figure 7:
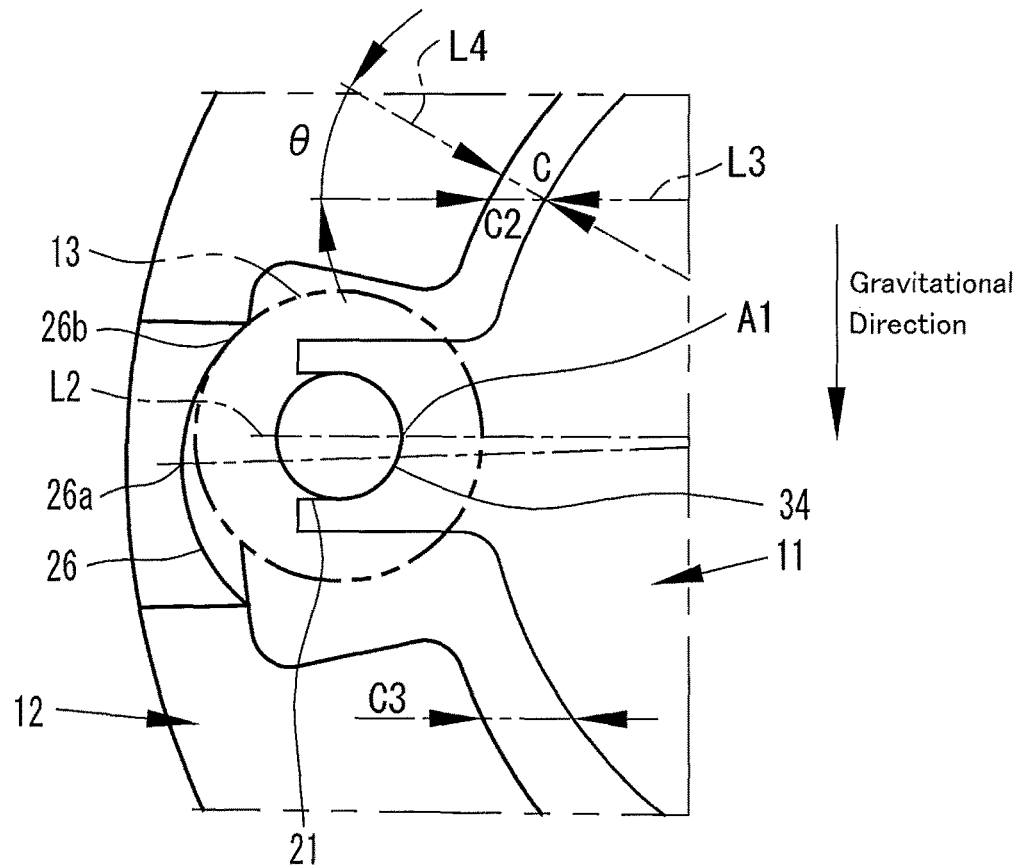
FIG. 7 is a partial front view showing a situation in which the guide section is situated at a position of 9 o'clock.

Situations of the rotary member 11 and the inertia body 12 when the rotary member 11 is rotated clockwise at a low speed without being subjected to the torque pulse are shown in FIGS. 5 to 7. Specifically, FIG. 5 shows a situation in which one of the guide sections 20 is situated at a position of 12 o'clock, FIG. 6 shows a situation in which one of the guide sections 20 is situated at a position of 6 o'clock, and FIG. 7 shows a situation in which one of the guide sections 20 is situated at a position of 9 o'clock.

When the rotary member 11 is rotated at a low speed, the inertia body 12 is rotated together with the rotary member 11 by the rolling members 13 individually brought into contact with the width ends 25b, 26b of the raceway surfaces 25, 26, while being attracted by gravity. In this situation, in the upper half of the rotary member 11 between the positions of 9 o'clock and 3 o'clock, the clearance C between the inner circumference 29 of the inertia body 12 and the outer circumference 27 of the rotary member 11 is reduced by the attraction of gravity and an inward displacement of the rolling member 13 along the raceway surfaces 25, 26, before the clearance A between the rolling member 13 and the bottom surface 34 of the guide section 20 is reduced. As described, the inner diameter of the inertia body 12 and the outer diameter of the rotary member 11 are set in such a manner that the clearance C is adjusted to be identical to or narrower than the aforementioned clearance A. In this situation, therefore, the diametrically small section 33 of the rolling member 13 has not yet been brought into contact with the bottom surface 34 of the guide wall 21 situated within the upper half of the rotary member 11. On the other hand, in the lower half of the rotary member 11 between the positions of 9 o'clock and 3 o'clock, a clearance C1 between the inner circumference 29 of a lowest section of the inertia body 12 and the outer circumference 27 of the rotary member 11 is increased as shown in FIG. 6.

When one of the rolling member 13 is situated at the position of 9 o'clock, as shown in FIG. 7, the rolling member 13 held in the guide wall 21 is pushed radially inwardly by the raceway surfaces 25, 26 to be brought into contact with the bottom surface 34 of the guide wall 21. Consequently, a clearance C2 between the inner circumference 29 of an upper section of the inertia body 12 and the outer circumference 27 of the rotary member 11 is reduced narrower than a clearance C3 between the inner circumference 29 of a lower section of the inertia body 12 and the outer circumference 27 of the rotary member 11.

The clearances C1 to C3 shown in FIGS. 5 to 7 may be calculated by multiplying the clearance C between the rotary member 11 and the inertia body 12 in the radial direction by $\cos \theta$ as an angle between: a line L3 passing through a point at which the clearance is calculated in parallel to a line L2 drawn between the rotational center L1 and a width center of the bottom surface 34 of the guide wall 21; and a line L4 extending radially while passing through the point at which the clearance is calculated.

In order to absorb a collision impact between the rotary member 11 and the inertia body 12, a buffer member may be interposed within the clearance C.

According to the exemplary embodiment, the buffer member may be arranged on at least one of the inner circumference 29 of the inertia body 12 and the outer circumference 27 of the rotary member 11. According to a first example shown in FIG. 8, the buffer member 28 is attached to the outer circumference 27 of the rotary member 11 at a portion expected to be brought into contact with the inner circumference 29 of the inertia body 12. For example, the buffer member 28 may be made of elastic material or impact absorbing material. That is, the buffer member 28 is softer than the rotary member 11 and the inertia body 12. In the following examples, the inner diameter of the inertia body 12 and the outer diameter of the rotary member 11 are also set in such a manner that the clearance C between the inner circumference 29 of the inertia body 12 and the outer circumference 27 of the rotary member 11 to which the buffer member 28 is attached becomes identical to or narrower than the aforementioned clearance A when the rotary member 11 is rotated at a high speed. Here, it is to be noted that the clearance C may also be a clearance between the inner circumference 29 of the inertia body 12 and a portion of the outer circumference 27 of the rotary member 11 to which the buffer member 28 is attached in the direction of gravitational force.

The buffer member 28 is attached to each of the outer circumferences 27 of the rotary member 11 between the guide sections 20. That is, three buffer members 28 are attached to the rotary member 11 in total. A circumferential length of each of the buffer members 28 is shorter than a circumferential length between the guide sections 20 respectively. According to the first example shown in FIG. 8, therefore, the collision noise in the torsional vibration damper 10 can be further suppressed. In addition, abrasion of the rotary member 11 and the inertia body 12 can be reduced.

Figure 8:
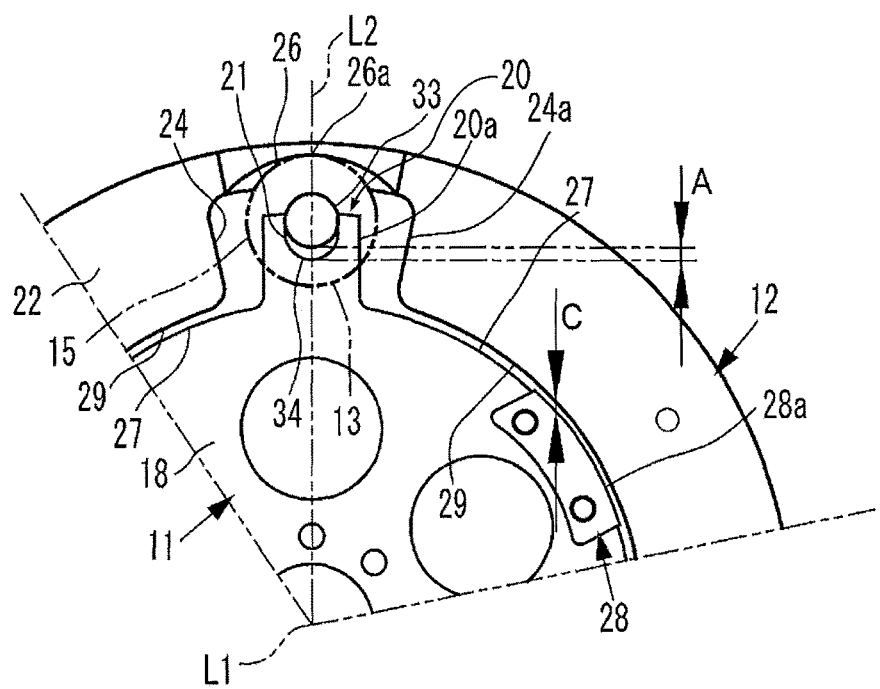
FIG. 8 is a partial front view showing a first example of a buffer member attached to the rotary member.
Figure 9:
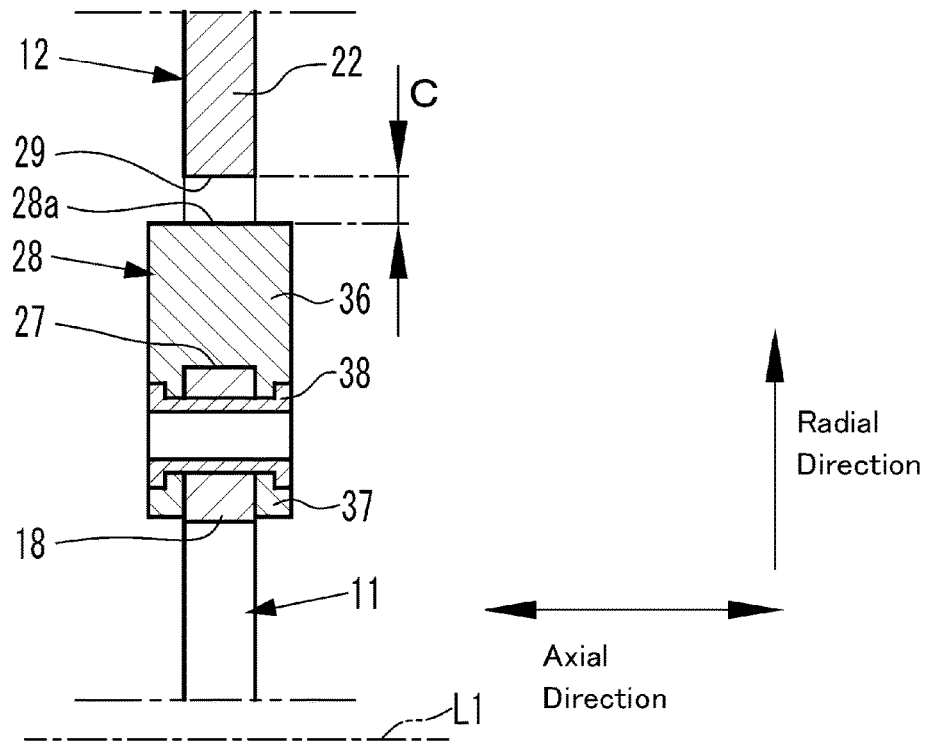
FIG. 9 is a partial cross-sectional view showing a cross-section of the buffer member shown in FIG. 8.

A cross-section of the buffer member 28 shown in FIG. 8 is shown in FIG. 9. As shown in FIG. 9, a thickness of the buffer member 28 is thicker than a thickness of the rotary member 11. Specifically, the buffer member 28 comprises a buffer portion 36 as a radially outer section being opposed to the inner circumference 29 of the inertia body 12, and a fixing portion 37 formed in a radially inner section. The fixing portion 37 has an inverse U-shaped cross-section so that the fixing portion 37 is fitted onto the outer circumference 27 of the rotary member 11, and a rivet 38 penetrates through the fixing portion 37 in a thickness direction to fix the buffer member 28 to the rotary member 11. Optionally, in order to reduce friction between the buffer member 28 and the inner circumference 29 of the inertia body 12, a plurality of projections may be formed on an outer circumferential face 28a of the buffer member 28.

Here will be explained another examples of the buffer member. In the following descriptions, detailed explanations for the elements in common with the foregoing examples will be omitted.

Figure 10:
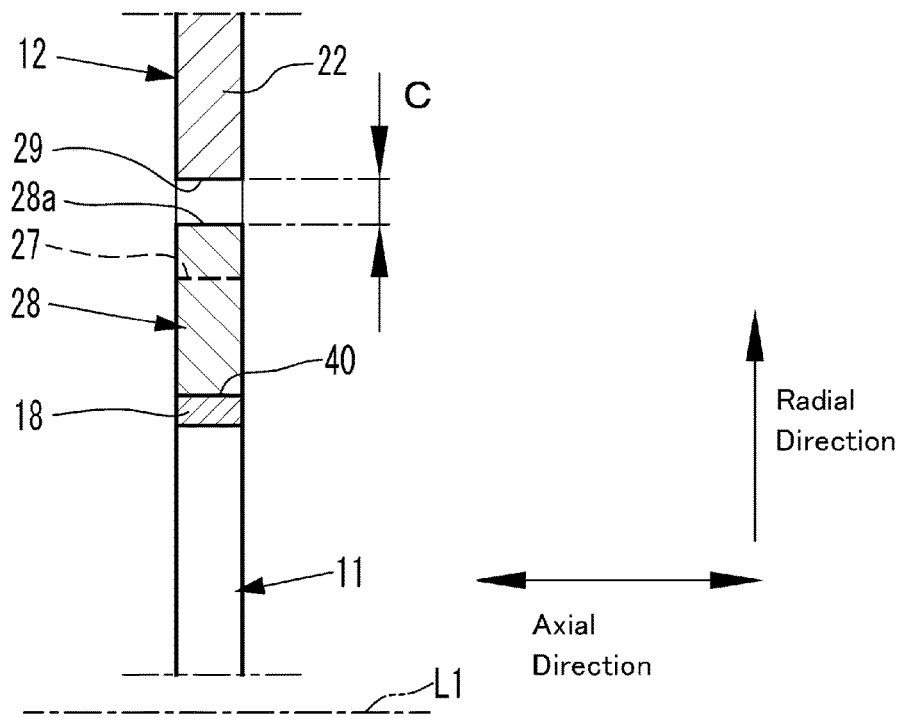
FIG. 10 is a partial cross-sectional view showing a cross-section of the buffer member according to a second example.

Turning to FIG. 10, there is shown a second example of the buffer member. According to the second example, a thickness of the buffer member 28 is substantially identical to the thickness of the rotary member 11, and the buffer member 28 is adhesively fitted into a depression 40 formed on the outer circumference 27 of the rotary member 11. Thus, according to the second example, the thickness of the buffer member 28 can be reduced.

Figure 11:
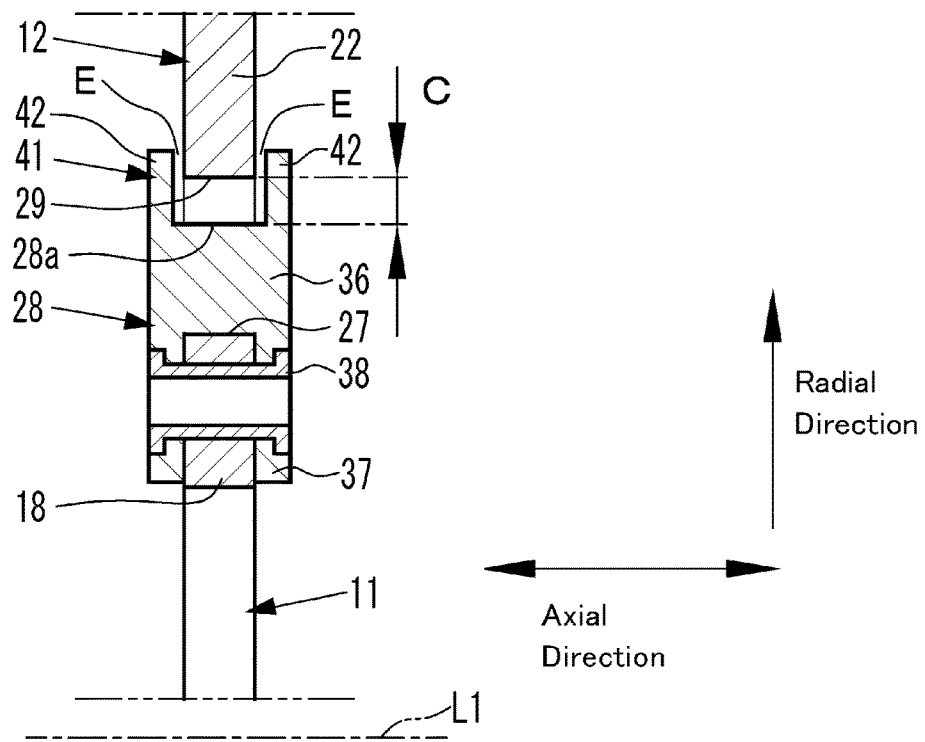
FIG. 11 is a partial cross-sectional view showing a cross-section of the buffer member according to a third example.

A third example of the buffer member is shown in FIG. 11. According to the third example, the buffer member 28 comprises a restricting section 41 to restrict an axial displacement of the inertia body 12. As illustrated in FIG. 11, specifically, the restricting section 41 comprises a pair of guide walls 42 protruding radially outwardly from axial ends of an outer circumferential face 28a of the buffer member 28. Specifically, lengths of the guide walls 42 are set in such a manner that the restricting section 41 of the buffer member 28 is fitted onto the inner circumference 29 of the inertia body 12 when the rotary member 11 is rotated at a high speed. A clearance E is maintained between each inner surface of the guide walls 42 so that the axial displacement of the inertia body 12 is restricted within the clearance E.

According to the third example, therefore, collision of the notch 24 of the inertia body 12 against the first diametrically large section 14 and the second diametrically large section 15 and the rolling member 13 in the axial direction can be prevented. In addition, collision of the rolling member 13 against the rotary member 11 may also be prevented. For these reasons, collision noises in the torsional vibration damper 10 can be further suppressed. Further, since the inertia body 12 is guided in the circumferential direction, the inertia body 12 is allowed to rotate accurately thereby suppressing torsional vibration effectively.

Figure 12:
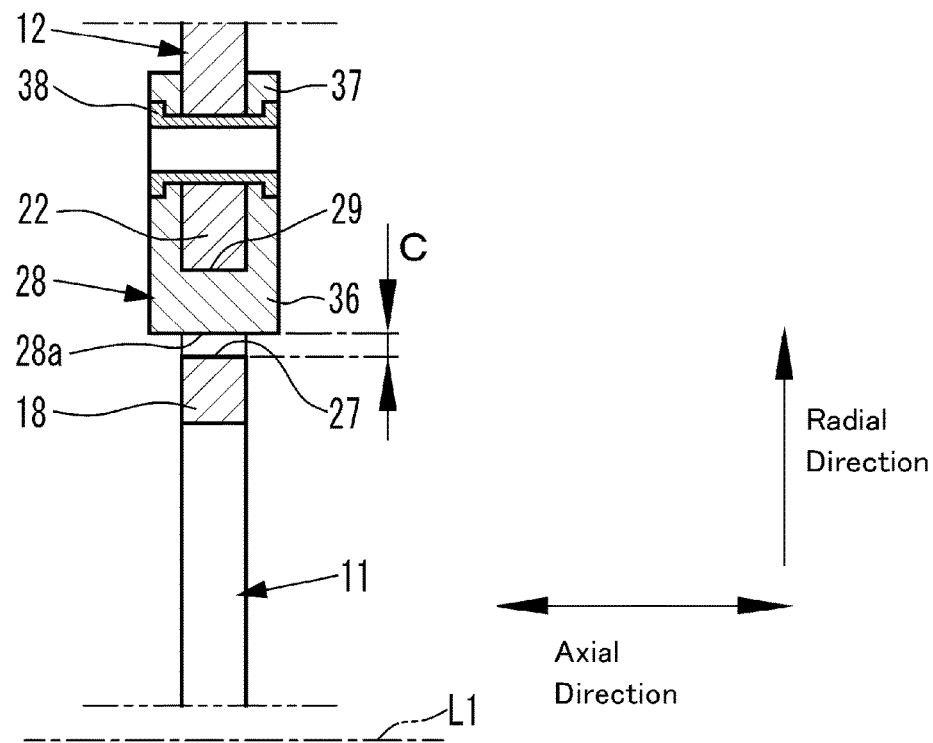
FIG. 12 is a partial cross-sectional view showing a cross-section of the buffer member according to a fourth example.

A fourth example of the buffer member is shown in FIG. 12. According to the fourth example, the buffer member 28 is attached to the inertia body 12. Specifically, the fixing portion 37 of the buffer member 28 is fitted onto the inner circumference 29 of the inertia body 12, and a rivet 38 penetrates through the fixing portion 37 in a thickness direction to fix the buffer member 28 to the inertia body 12.

Figure 13:
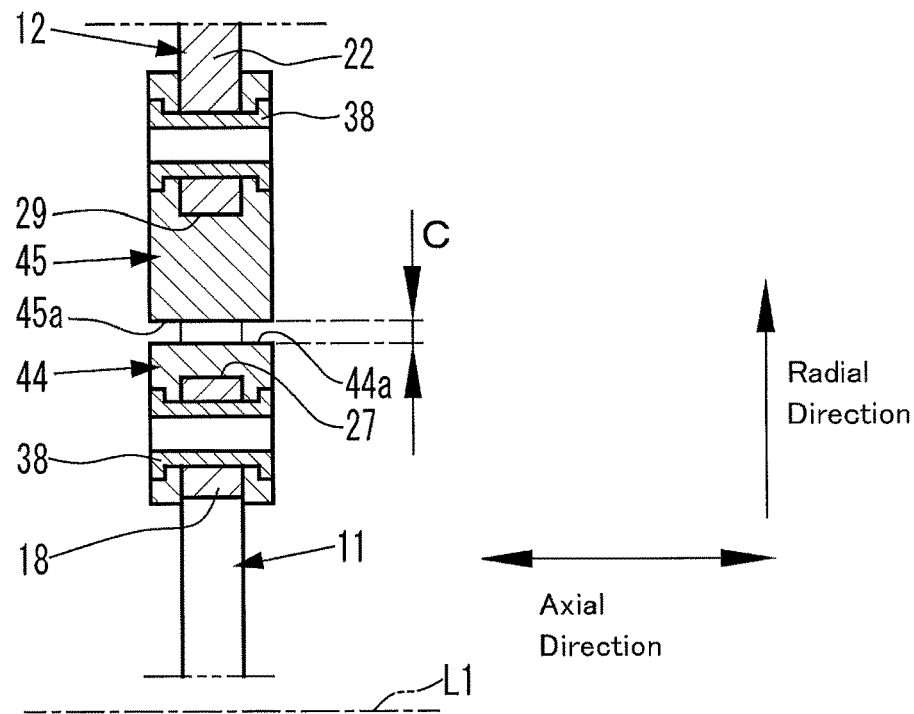
FIG. 13 is a partial cross-sectional view showing a cross-section of the buffer member according to a fifth example.
Figure 14:
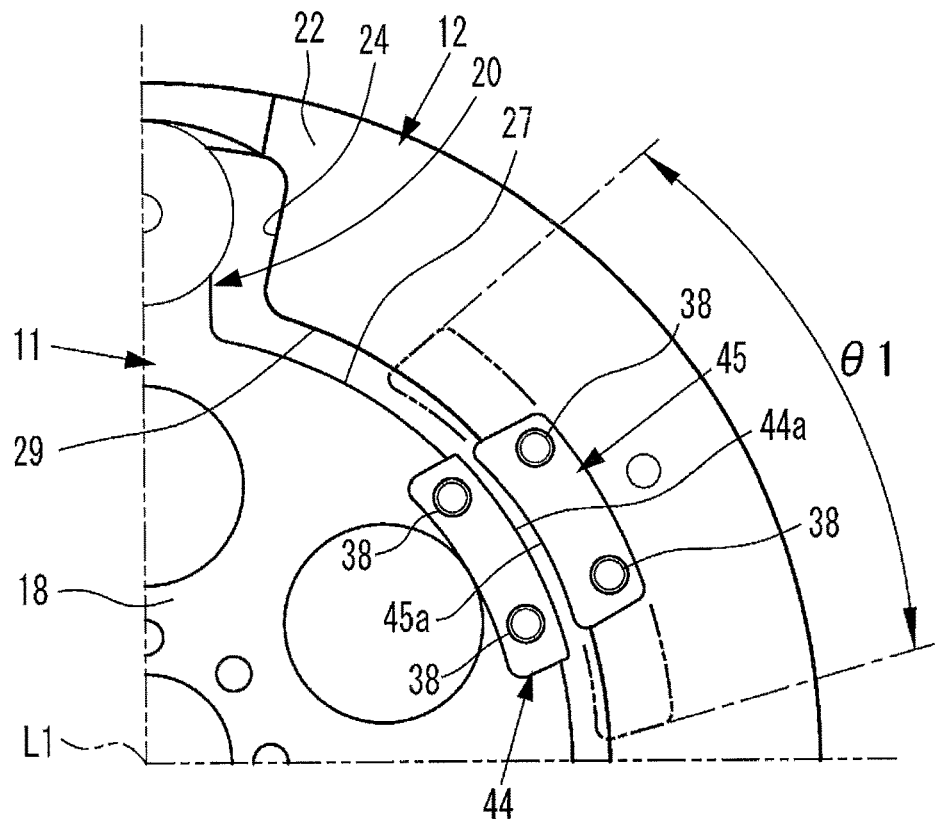
FIG. 14 is a partial front view showing the buffer member according to a fifth example.

A fifth example of the buffer member is shown in FIGS. 13 and 14. According to the fifth example, the buffer member 28 comprises a first buffer member 44, and a second buffer member 45. As illustrated in FIGS. 13 and 14, specifically, the second buffer member 45 is attached to the inner circumference 29 of the inertia body 12 by the rivet 38 within an oscillation range θ1 of the inertia body 12, and the first buffer member 44 is attached to the outer circumference 27 of the rotary member 11 by the rivet 38 to be opposed to the second buffer member 45.

Figure 15:
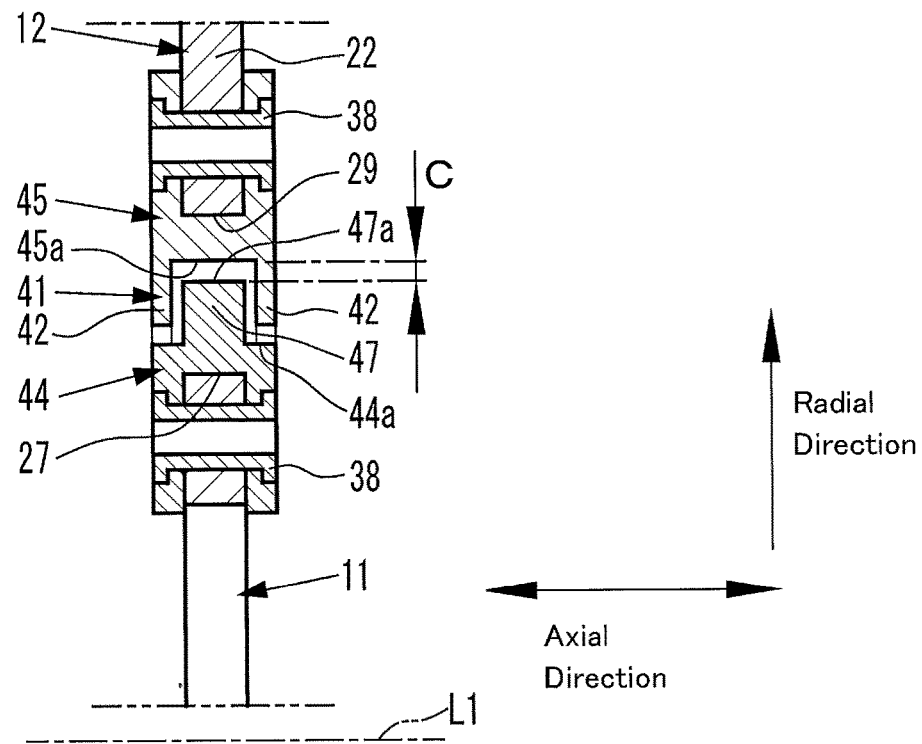
FIG. 15 is a partial cross-sectional view showing a cross-section of the buffer member according to a sixth example.

A sixth example of the buffer member as a modification of the fifth example is shown in FIG. 15. According to the sixth example, the second buffer member 45 is provided with the pair of guide walls 42 explained in the third example to restrict the axial displacement of the inertia body 12. Specifically, the guide walls 42 protrude radially inwardly from axial ends of an inner circumferential face 45a of the second buffer member 45.

On the other hand, the first buffer member 44 is provided with a flange 47 protruding radially outwardly from an outer circumferential face 44a of the first buffer member 44 to be fitted into a clearance between the guide walls 42 of the second buffer member 45. That is, a thickness of the flange 47 is thinner than the clearance between the guide walls 42. According to the sixth example, the clearance C is also maintained between an outer circumferential face 47a of the flange 47 of the first buffer member 44 and an inner circumferential face 45a of the second buffer member 45 between the guide walls 42. That is, the inner circumferential face 45a of the second buffer member 45 attached to the inertia body 12 comes into contact with the outer circumferential face 47a of the flange 47 of the first buffer member 44 attached to the rotary member 11 when the rotary member 11 is stopped or rotated at a low speed. According to the fifth and sixth examples, therefore, the collision impact of the inertia body 12 against the rotary member 11 may be absorbed by two buffer members 44 and 45. For these reasons, collision noises in the torsional vibration damper 10 can be suppressed more effectively. Alternatively, lengths of the guide walls 42 of the second buffer member 45 in the radial direction may also be adjusted to come into contact with outer circumferential faces of the first buffer member 44 on both sides of the flange 47, when the rotary member 11 is stopped or rotated at a low speed.

Further, although not especially illustrated, the first buffer member 44 may also be shaped to have an L-shaped cross-section, and the second buffer member 45 may also be shaped to have an inverse L-shaped cross-section to be fitted with the first buffer member 44.

Figure 16:
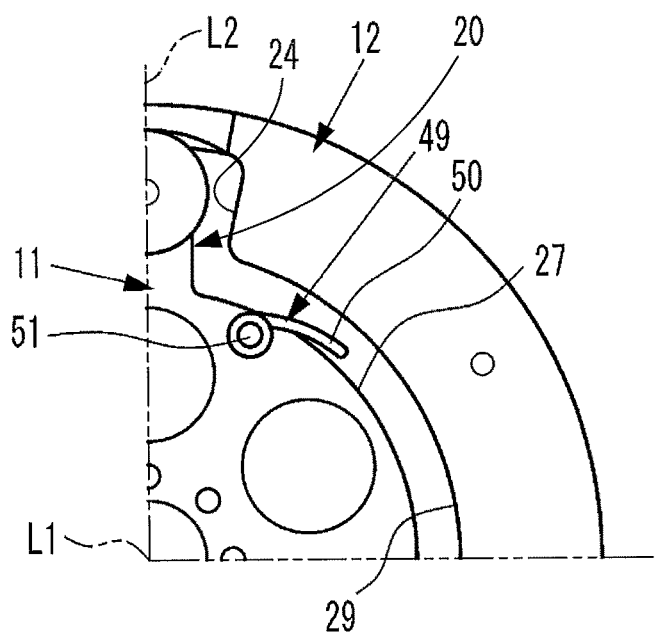
FIG. 16 is a partial front view showing the buffer member according to a seventh example.

A seventh example of the buffer member is shown in FIG. 16. According to the seventh example, a blade spring 49 is adopted as the buffer member. The blade spring 49 comprises a spring portion 50 and an installation portion 51. Specifically, the installation portion 51 is fixed to the rotary member 11 by e.g., a rivet in the vicinity of the outer circumference 27 of the rotary member 11 so that the spring portion 50 is interposed between the outer circumference 27 and the inner circumference 29 of the inertia body 12. According to the seventh example, therefore, the collision impact of the inertia body 12 against the rotary member 11 may be absorbed by the blade spring 49. Instead, the blade spring 49 may also be attached to the inertia body 12 in the vicinity of the inner circumference 29.

Figure 17:
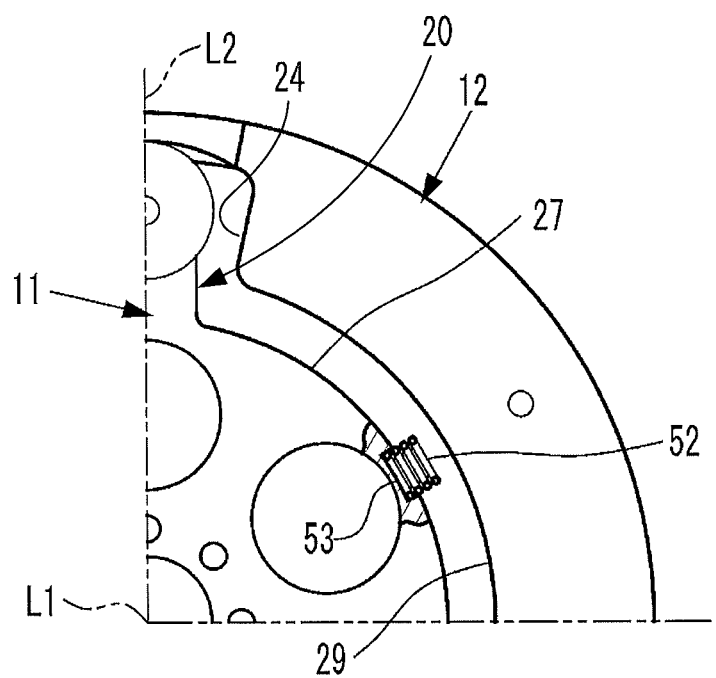
FIG. 17 a partial front view showing the buffer member according to an eighth example.

An eighth example of the buffer member is shown in FIG. 17. According to the eighth example, a coil spring 52 is adopted as the buffer member. Specifically, a depression 53 is formed on the outer circumference 27 of the rotary member 11. One end of the coil spring 52 is press fitted into the depression 53 in such a manner that the other end of the coil spring 52 protrudes from the depression 53 toward the inner circumference 29 of the inertia body 12. Optionally, the coil spring 52 may be fixed to the depression 53 by adhesive agent. According to the eighth example, therefore, the collision noise generated when the inertia body 12 collides against the rotary member 11 is absorbed by the coil spring 52. Instead, the coil spring 52 may also be attached to the outer circumference 27 of the rotary member 11 by a predetermined fixing member, without forming the depression 53. Alternatively, the coil spring 52 may also be attached to the inner circumference 29 of the inertia body 12.

Figure 18:
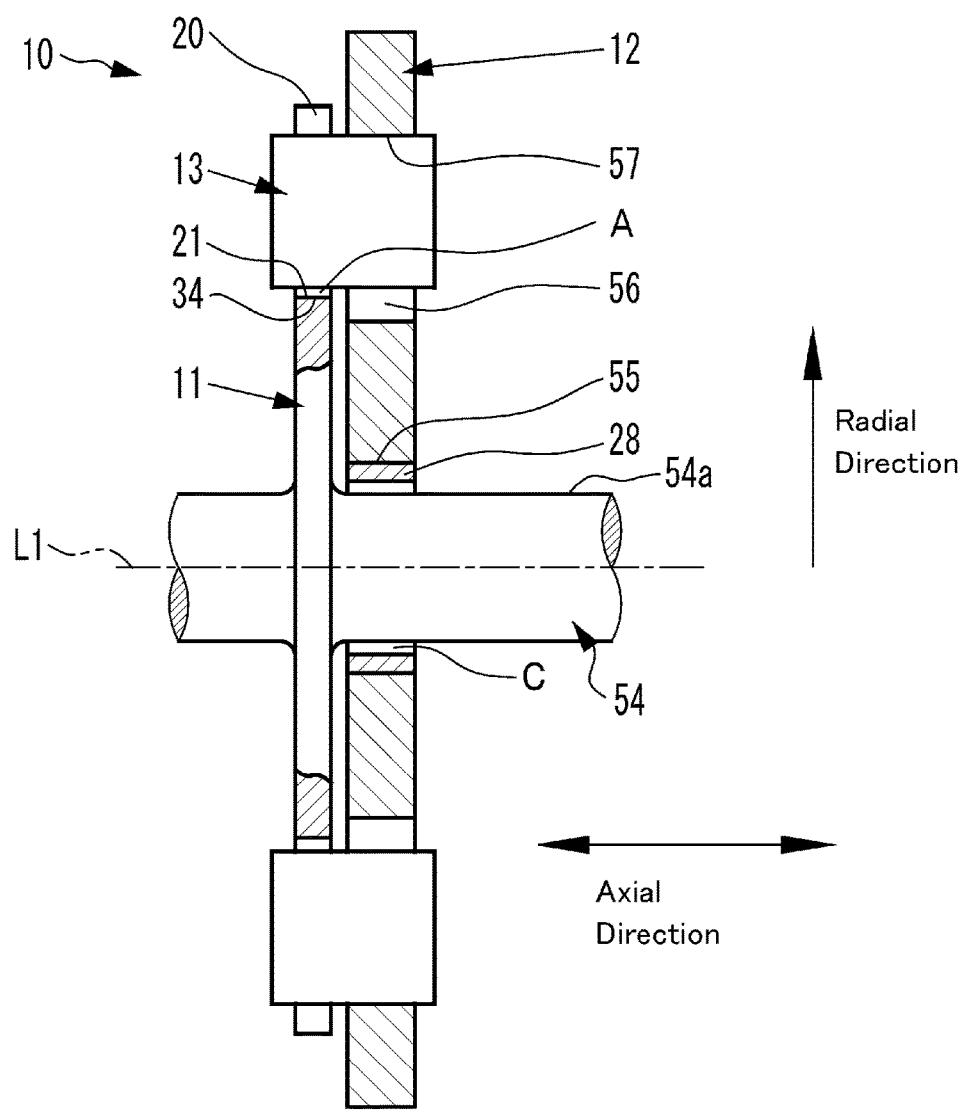
FIG. 18 is a partial cross-sectional view showing another example of the torsional vibration damper.

Turning to FIG. 18, there is shown another example of the torsional vibration damper according to the present disclosure.

In the torsional vibration damper 10 shown in FIG. 18, the inertia body 12 is displaced relatively from the rotary member 11 in the axial direction. According to another example, the rotary member 11 comprises a shaft 54 extending along the rotational center L1, and the plurality of guide sections 20 formed on the outer circumference 27 of the rotary member 11 at regular intervals. Further, each of the rolling members 13 is individually shaped into a cylindrical or column shape having a predetermined length in the axial direction.

The inertia body 12 is shaped into a substantially disc shape comprising a center hole 55 to which the shaft 54 of the rotary member 11 is inserted, and a same number of bores 56 as the guide sections 20 are formed at regular intervals to be opposed to the guide sections 20. Specifically, each of the bores 56 is individually penetrates through the inertia body 12 in the thickness direction. According to another example, each of the rolling members 13 is held individually in the guide section 20 of the rotary member 11 and the bore 56 of the inertia body 12 opposed to the guide section 20. That is, a radially outer section of each of the bores 56 individually serves as a raceway surface 57 on which the rolling member 13 rolls. Specifically, as shown in FIG. 18, the rolling members 13 are centrifugally pushed onto radially outermost portions of the raceway surfaces 57 when the rotary member 11 is rotated at a high speed.

In the situation shown in FIG. 18, a clearance A is created between a radially innermost portion of each of the rolling members 13 and the bottom surface 34 of each of the guide sections 20, and a clearance C is created between an outer circumferential surface 54a of the shaft 54 and the center hole 55. According to another example, the clearance C is also reduced before the clearance A is reduced, in other words, the clearance C is narrower than the clearance A. That is, when the inertia body 12 drops gravitationally, an inner edge of the center hole 55 of the inertia body 12 comes into contact with the shaft 54 of the rotary member 11, before the radially innermost portion of the rolling member 13 situated at the highest level comes into contact with the bottom surface 34 of the guide section 20 of the rotary member 11.

To this end, a radial position of the raceway surface 57, a diameter of the rolling member 13, a radial position of the bottom surface 34, an outer diameter of the shaft 54, and an inner diameter of the center hole 55 are set in such a manner that the clearance C is adjusted identical to or narrower than the clearance A when the rotary member 11 is rotated at a high speed. Optionally, the buffer member 28 may be attached to at least one of the inner edges of the center hole 5 of the inertia body 12 and the outer circumferential surface 54a of the shaft 54. In the example shown in FIG. 18, the buffer member 28 is attached to the inner edge of the center hole 5 of the inertia body 12. In this case, at least one of the diameters of the center hole 55 and the shaft 54 is/are adjusted to have the clearance C narrower than the clearance A. Further, the buffer member 28 may be provided with the aforementioned restricting section 41.

Turning back to the first example of the torsional vibration damper 10 shown e.g., in FIGS. 4A and B, the buffer member 28 may also be arranged to absorb a collision impact resulting from collision of the guide section 20 against the side surface of the notch 24.

Figure 19:
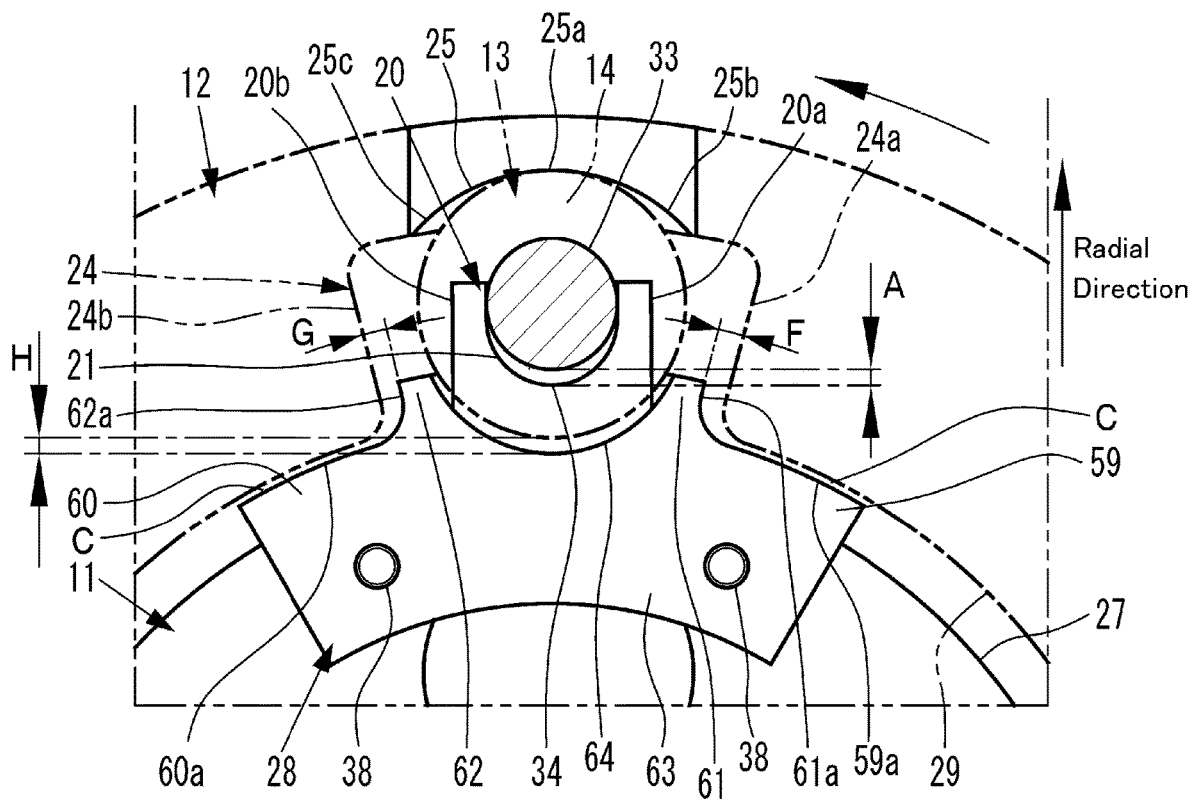
FIG. 19 is a partial front view showing the buffer member according to a ninth example.
Figure 20:
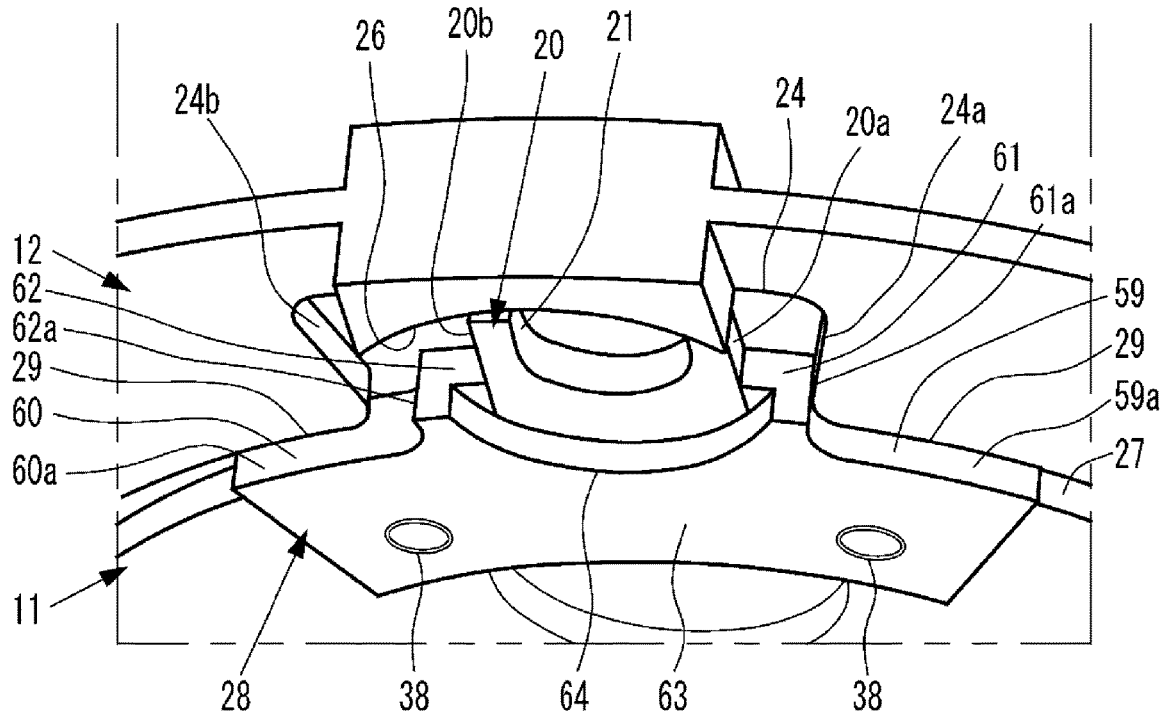
FIG. 20 is a partial perspective view showing the buffer member according to a ninth example.

A ninth example of the buffer member is shown in FIGS. 19 and 20. In FIGS. 19 and 20, the second diametrically large section 15 is omitted for the sake of illustration.

According to the ninth example, the buffer member 28 comprises a first buffering portion 59, a second buffering portion 60, a third buffering portion 61, a fourth buffering portion 62, and an installation portion 63. Specifically, the first buffering portion 59 is interposed between the outer circumference 27 of the rotary member 11 and the inner circumference 29 of the inertia body 12 on one side of the guide section 20, and the second buffering portion 60 is interposed between the outer circumference 27 of the rotary member 11 and the inner circumference 29 of the inertia body 12 on the other side of the guide section 20. The installation portion 63 is fixed to one surface of the rotary member 11 by rivets 38. According to the ninth example, therefore, the collision impact of the inertia body 12 against the rotary member 11 may be absorbed by the first buffering portion 59 and the second buffering portion 60. As the foregoing examples, the clearance C between the inner diameter of the inertia body 12 and the outer diameter of the rotary member 11 are also set in such a manner that the clearance C between the inner circumference 29 of the inertia body 12 and the outer circumference 27 of the rotary member 11 to which the buffer member 28 is attached is adjusted identical to or narrower than the aforementioned clearance A when the rotary member 11 is rotated at a high speed.

As described, the clearance A between the diametrically small section 33 of the rolling member 13 and the bottom surface 34 of the guide section 20 is slightly wider than the displacement distance B of the rolling member 13. That is, the rolling member 13 oscillated by the torque pulse from the radially outermost points 25a, 26a of the raceway surfaces 25, 26 rolls beyond the width ends 25b, 26b of the raceway surfaces 25, 26. That is, a clearance F between the first side surface 20a of the guide section 20 of the rotary member 11 and the first side surface 24a of the notch 24 is reduced. Consequently, the first side surface 20a of the guide section 20 of the rotary member 11 comes into contact with the first side surface 24a of the notch 24. In order to absorb a collision impact of the first side surface 20a of the guide section 20 against the first side surface 24a of the notch 24, the third buffering portion 61 is interposed between the first side surface 20a of the guide section 20 and the first side surface 24a of the notch 24.

Likewise, the rolling member 13 oscillated by the torque pulse from the radially outermost points 25a, 26a of the raceway surfaces 25, 26 rolls beyond other width ends 25c, 26c of the raceway surfaces 25, 26. That is, a clearance G between the second side surface 20b of the guide section 20 of the rotary member 11 and the second side surface 24b of the notch 24 is reduced. Consequently, the second side surface 20b of the guide section 20 of the rotary member 11 comes into contact with the second side surface 24b of the notch 24. In order to absorb a collision impact of the second side surface 20b of the guide section 20 against the second side surface 24b of the notch 24, the fourth buffering portion 62 is interposed between the second side surface 20b of the guide section 20 and the second side surface 24b of the notch 24.

Optionally, in order to maintain the rotary member 11 in balance in the axial direction, the installation portion 63 may also be attached to the other surface of the rotary member 11. In addition, in order to allow the inertia body 12 to rotate accurately, the first buffering portion 59 and the second buffering portion 60 may be provided with the aforementioned restricting section 41 respectively.

In the buffer member 28 according to the ninth example, an arcuate surface between the third buffering portion 61 and the fourth buffering portion 62 serves as a fifth buffering portion 64. Specifically, the clearance A between the diametrically small section 33 of the rolling member 13 and the bottom surface 34 of the guide section 20 is substantially identical to a clearance H between the second diametrically large section 15 and the fifth buffering portion 64. Therefore, the collision impact of the rolling member 13 against the bottom surface 34 of the guide section 20 can be absorbed by the fifth buffering portion 64.

The buffer member 28 according to the ninth example may also be divided into a first part including the first buffering portion 59 and the third buffering portion 61, and a second part including the second buffering portion 60 and the fourth buffering portion 62. In this case, the first part and the second part are arranged adjacent to each other in the circumferential direction of the rotary member 11 across the guide section 20.

Further, the buffer member 28 according to the ninth example may also be attached to the inertia body 12 in such a manner as to cover the notch 24. In this case, the buffer member 28 may also be divided into a first part covering the first side surface 24a of the notch 24, and a second part covering the second side surface 24b of the notch 24.

Here will be explained reference examples of the buffer member in which first buffering portion 59 and the second buffering portion 60 are omitted.

Figure 21:
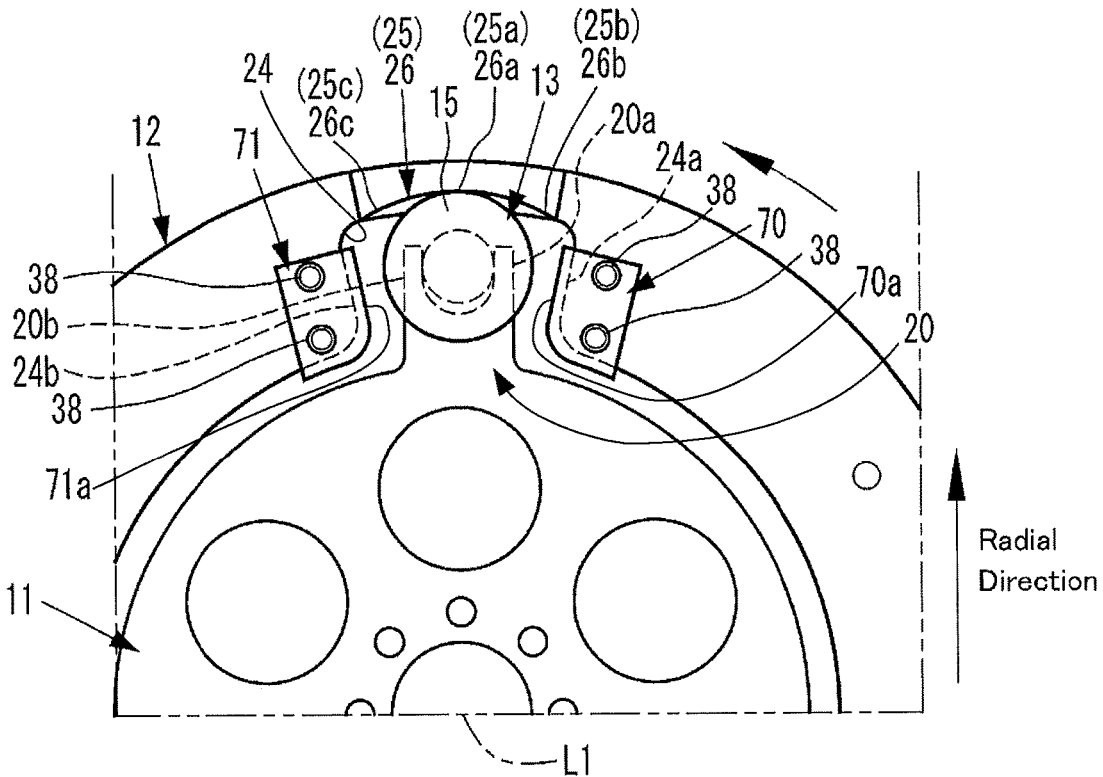
FIG. 21 is a partial front view showing the buffer member according to a first reference example.
Figure 22:
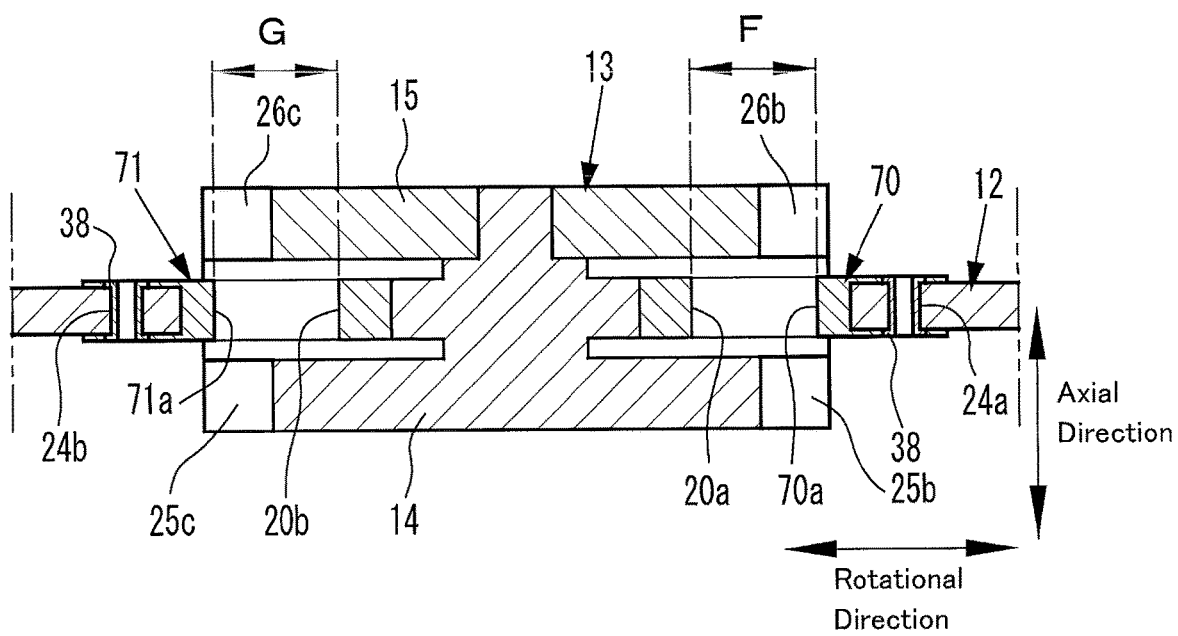
FIG. 22 is a partial cross-sectional view showing a cross-section of the buffer member according to the first reference example.

A first reference example of the buffer member is shown in FIGS. 21 and 22. According to the first reference example, the buffer member comprises a first buffer member 70 and a second buffer member 71. Specifically, the first buffer member 70 is attached to the first side surface 24a of the notch 24 by the rivet 38 so that the first side surface 20a of the guide section 20 comes into contact with a first contact surface 70a of the first buffer member 70. Therefore, the collision impact of the first side surface 20a of the guide section 20 against the first side surface 24a of the notch 24 is absorbed by the first buffer member 70.

On the other hand, the second buffer member 71 is attached to the second side surface 24b of the notch 24 by the rivet 38 so that the second side surface 20b of the guide section 20 comes into contact with a second contact surface 71a of the second buffer member 71. Therefore, the collision impact of the second side surface 20b of the guide section 20 against the second side surface 24b of the notch 24 is absorbed by the second buffer member 71. A thickness of each of the first buffer member 70 and the second buffer member 71 is individually thinner than the clearance of the first diametrically large section 14 and the second diametrically large section 15 of the rolling member 13.

Figure 23:
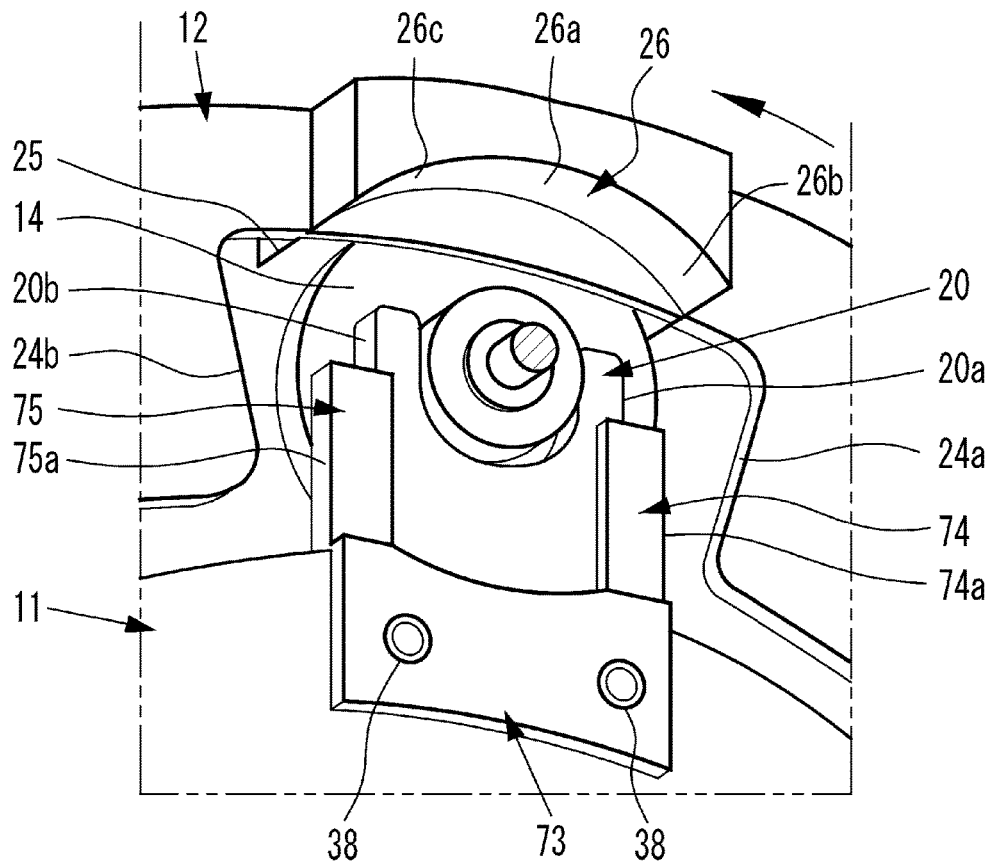
FIG. 23 is a partial front view showing the buffer member according to a second reference example.
Figure 24:
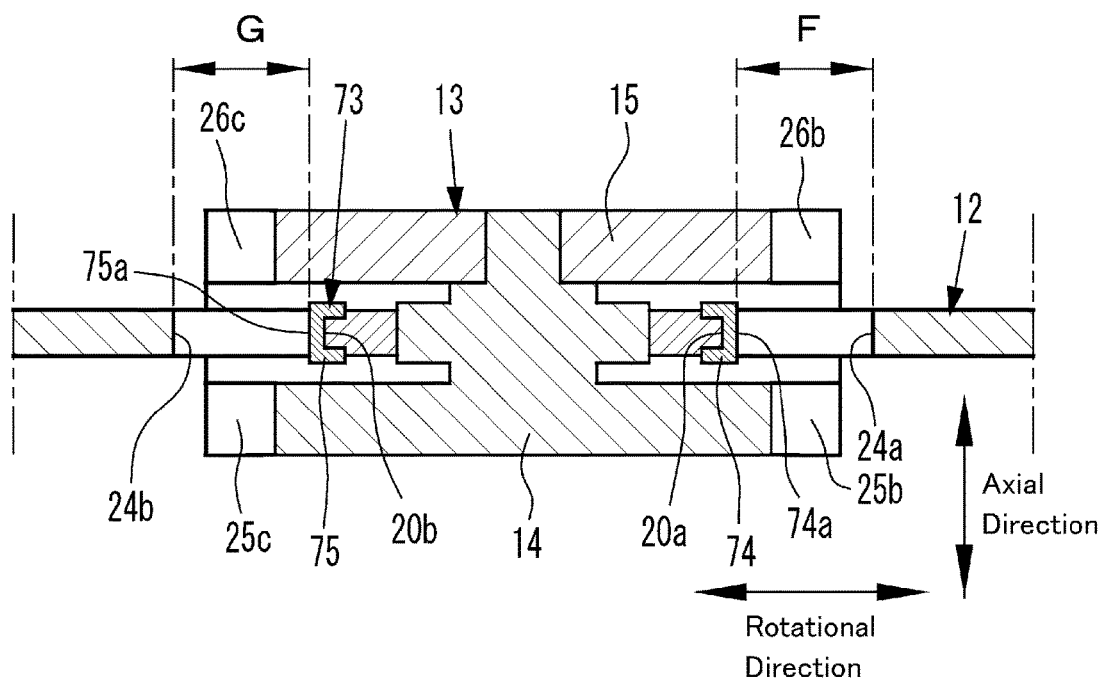
FIG. 24 is a partial cross-sectional view showing a cross-section of the buffer member according to the second reference example.

A second reference example of the buffer member is shown in FIGS. 23 and 24.

In FIG. 23, the second diametrically large section 15 of the rolling member 13 is omitted for the sake of illustration. According to the second reference example, a buffer member 73 is attached to the rotary member 11 by the rivet 38 at radially inner side of the guide section 20. The buffer member 73 comprises a first buffering portion 74 and a second buffering potion 75. Specifically, the first buffering portion 74 covers the first side surface 20a of the guide section 20 from circumferentially outer side so that a first contact surface 74a of the first buffering portion 74 comes into contact with the first side surface 24a of the notch 24. Therefore, the collision impact of the first side surface 20a of the guide section 20 against the first side surface 24a of the notch 24 is absorbed by the first buffering portion 74.

On the other hand, the second buffering portion 75 covers the second side surface 20b of the guide section 20 from circumferentially outer side so that a second contact surface 75a of the second buffering portion 75 comes into contact with the second side surface 24b of the notch 24. Therefore, the collision impact of the second side surface 20b of the guide section 20 against the second side surface 24b of the notch 24 is absorbed by the second buffering portion 75. A thickness of each of the first buffering portion 74 and the second buffering portion 75 is individually thinner than the clearance of the first diametrically large section 14 and the second diametrically large section 15 of the rotary member 13.

The buffer member 73 of the second reference example may be combined with the buffer members of the foregoing examples according to need.

Figure 25:
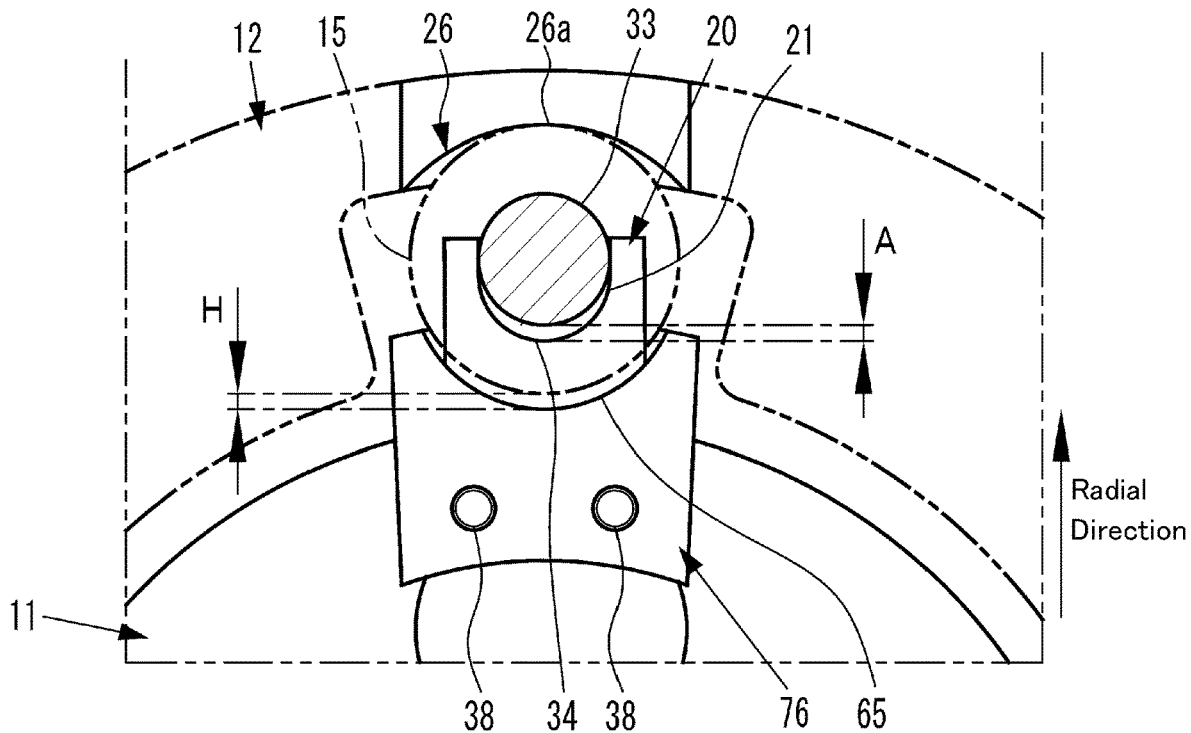
FIG. 25 is a partial front view showing the buffer member according to a third reference example.

A third reference example of the buffer member is shown in FIG. 25.

According to the third reference example, a buffer member 76 is attached to the rotary member 11 by the rivet 38 at radially inner side of the guide section 20. The buffer member 76 comprises an arcuate surface 65 serving as the aforementioned fifth buffering portion 64, and a curvature radius of the arcuate surface 65 is substantially identical to the curvature radius of the second diametrically large section 15 of the rolling member 13. Specifically, the clearance A between the diametrically small section 33 of the rolling member 13 and the bottom surface 34 of the guide section 20 is substantially identical to the clearance H between the second diametrically large section 15 and the arcuate surface 65. Therefore, the second diametrically large section 15 of the rolling member 13 is brought into contact with the bottom surface 34 of the guide section when the diametrically small section 33 of the rolling member 13 comes into contact with the bottom surface 34 of the guide section 20. For this reason, the collision impact of the diametrically small section 33 of the rolling member 13 against the bottom surface 34 of the guide section 20 can be absorbed by arcuate surface 65 as the fifth buffering portion 64.

Optionally, in order to maintain the rotary member 11 in balance in the axial direction, the buffer member 76 may also be attached to the other surface of the rotary member 11.

Alternatively, the collision impact of the diametrically small section 33 of the rolling member 13 against the bottom surface 34 of the guide section 20 may also be absorbed by arranging the buffer member on at least one of the diametrically small section 33 of the rolling member 13 and the bottom surface 34 of the guide section 20. Further, the buffer member 76 of the third reference example may also be combined with the buffer members of the foregoing examples according to need.

Figure 26:
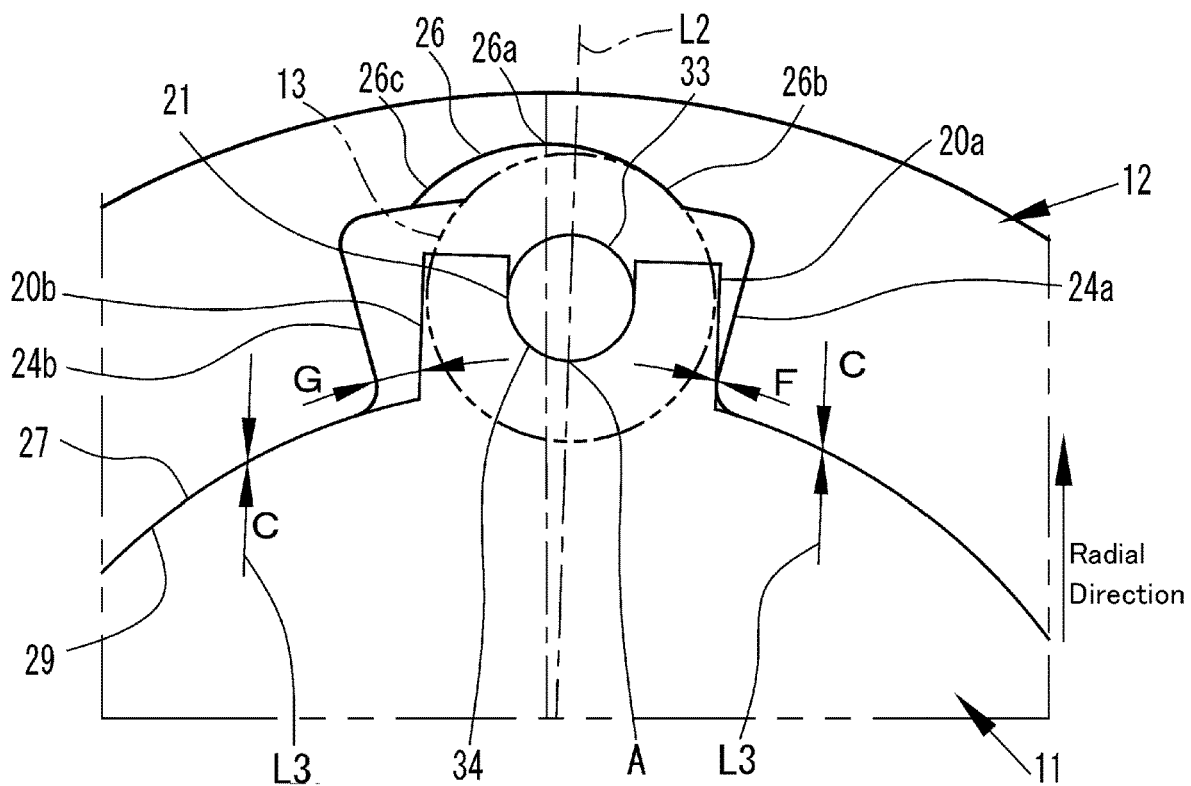
FIG. 26 is a partial front view showing still another example of the torsional vibration damper.

Turning to FIG. 26, there is shown still another example of the torsional vibration damper according to the present disclosure. In the torsional vibration damper shown in FIG. 26, the clearance F or G, and the clearance C are reduced simultaneously when the clearance A is reduced. Specifically, FIG. 26 shows a situation in which the rotary member 11 is rotated at a low speed while being subjected to the torque pulse. In this situation, the rolling member 13 is situated at the width ends 25b, 26b of the raceway surfaces 25, 26, and the inertia body 12 drops gravitationally.

Consequently, the rolling member 13 is displaced radially inwardly by the force of gravity and the raceway surfaces 25, 26 so that the diametrically small section 33 of the rolling member 13 is brought into contact with the bottom surface 34 of the guide section 20 of the rotary member 11. That is, the clearance A is reduced. As a result, the rolling member 13 is locked by the raceway surfaces 25, 26 and the bottom surface 34 of the guide section 20 so that the relative rotation of the inertia body 12 to the rotary member 11 is stopped. In the torsional vibration damper shown in FIG. 26, the clearance C between the inner circumference 29 of the inertia body 12 and the outer circumference 27 of the rotary member 11 is also set identical to or narrower than the aforementioned clearance A. Therefore, when the inertia body 12 drops gravitationally, the clearance C is reduced simultaneously when the clearance A is reduced.

In the torsional vibration damper shown in FIG. 26, a width of one of the guide walls 21 of the guide section 20 in the circumferential direction is set in such a manner that the clearance F between the first side surface 20a of the guide section 20 of the rotary member 11 and the first side surface 24a of the notch 24 is reduced simultaneously with the reduction in the clearance A.

Likewise, a width of the other guide wall 21 of the guide section 20 in the circumferential direction is set in such a manner that the clearance G between the second side surface 20b of the guide section 20 of the rotary member 11 and the second side surface 24b of the notch 24 is reduced simultaneously with the reduction in the clearance A.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A torsional vibration damper, comprising:
a disc-shaped rotary member that is configured to be rotated by a torque applied thereto;
an annular-shaped inertia body that is arranged coaxially with the rotary member and configured to oscillate with respect to the rotary member in response to a pulsation of the torque;
a plurality of rolling members interposed between the rotary member and the inertial body that are configured to transmit the torque applied to the rotary member to the inertia body;
a plurality of guide sections formed on an outer circumference of the rotary member to hold each rolling member of the plurality of rolling members, that permit the rolling members to move in a radial direction and restrict the rolling members from moving in a circumferential direction;
a plurality of raceway surfaces formed on the inertia body to which the respective rolling members are contacted, whose curvature radii are individually shorter than a curvature radius of an outer circumference of the inertia body; and
a buffer member attached to at least one of an inner circumference of the inertia body and the outer circumference of the rotary member,
wherein the rotary member and the inertia body are arranged in such a manner that the outer circumference of the rotary member and the inner circumference of the inertia body are opposed to each other, and
a first clearance between the outer circumference of the rotary member and the inner circumference of the inertia body created when the rolling members are individually pushed onto a radially outermost point of each of the respective raceway surfaces by a centrifugal force is identical to or narrower than a second clearance between one of the rolling members situated at a highest level and a bottom surface of the guide section.

2. The torsional vibration damper as claimed in claim 1, wherein the buffer member comprises a restricting section that restricts a displacement of the inertia body in the axial direction.

3. The torsional vibration damper as claimed in claim 1, wherein the inertia body is arranged on a radially outer side of the rotary member,
the inertia body comprises a plurality of notches formed in a radially inner portion of the inertia body to hold each guide section of the plurality of guide sections, and
the buffer member is attached to the outer circumference of the rotary member in each clearance between the guide sections.

4. The torsional vibration damper as claimed in claim 1, wherein the inertia body is arranged on a radially outer side of the rotary member,
the inertia body comprises a plurality of notches formed in a radially inner portion of the inertia body to hold each guide section of the plurality of guide sections, and
the buffer member is attached to the inner circumference of the inertia body in each clearance between the notches.

5. The torsional vibration damper as claimed in claim 1, wherein the inertia body is arranged on a radially outer side of the rotary member,
the inertia body comprises a plurality of notches formed in a radially inner portion of the inertia body to hold each guide section of the plurality of guide sections,
the buffer member includes a first buffer member attached to the outer circumference of the rotary member in each clearance between the guide sections, and a second buffer member attached to the inner circumference of the inertia body in each clearance between the notches, and
the first buffer member and the second buffer member are opposed to each other.

6. The torsional vibration damper as claimed in claim 1, wherein the inertia body is arranged on a radially outer side of the rotary member, the inertia body comprises a plurality of notches formed in a radially inner portion of the inertia body to hold each guide section of the plurality of guide sections, and the buffer member includes a first buffering portion that is interposed in each clearance between a side surface of the guide section and one of side a side surface of the notch, and a second buffering portion interposed in each clearance between another side surface of the guide section and another side surface of the notch.

* * * * *

UNITED STATES PATENT AND TRADEMARK OFFICE
CERTIFICATE OF CORRECTION

PATENT NO.        : 10,788,099 B2
APPLICATION NO.   : 16/539108
DATED             : September 29, 2020
INVENTOR(S)       : Taiki Nakamura et al.

Page 1 of 1

It is certified that error appears in the above-identified patent and that said Letters Patent is hereby corrected as shown below:

In the Claims

In Claim 6, at Column 19, Line 7:
"the guide section and one of side a side surface of the"
Should be changed to:
--the guide section and a side surface of the--

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*